US006926431B1

(12) United States Patent
Foote et al.

(10) Patent No.: US 6,926,431 B1
(45) Date of Patent: Aug. 9, 2005

(54) VEHICULAR MIRROR ASSEMBLY INCORPORATING MULTIFUNCTIONAL ILLUMINATION SOURCE

(75) Inventors: Keith D. Foote, Kentwood, MI (US); Ian Boddy, Ada, MI (US); Kris D. Brown, Lake Odessa, MI (US); Kenneth C. Peterson, Comstock Park, MI (US)

(73) Assignee: Magna Donnelly Mirrors North America, L.L.C., Kentwood, MI (US)

( * ) Notice: Subject to any disclaimer, the term of this patent is extended or adjusted under 35 U.S.C. 154(b) by 146 days.

(21) Appl. No.: 10/249,431

(22) Filed: Apr. 8, 2003

Related U.S. Application Data

(60) Provisional application No. 60/319,174, filed on Apr. 9, 2002, provisional application No. 60/319,175, filed on Apr. 9, 2002, provisional application No. 60/319,323, filed on Jun. 18, 2002.

(51) Int. Cl.⁷ ................................................. B60Q 1/26
(52) U.S. Cl. ....................... 362/494; 362/134; 362/144; 362/524
(58) Field of Search ................................ 362/494, 524, 362/492, 135, 140, 141, 144; 340/825.36, 340/825.49

(56) References Cited

U.S. PATENT DOCUMENTS

| 1,096,452 | A | 5/1914 | Perrin |
| 1,278,741 | A | 9/1918 | Phelps |
| 1,353,253 | A | 9/1920 | Livingston et al. |
| 1,415,465 | A | 5/1922 | Nigh |
| 1,458,703 | A | 6/1923 | Harris et al. |
| 1,563,258 | A | 11/1925 | Cunningham |
| 1,602,094 | A | 10/1926 | Badding |
| 2,010,138 | A | 8/1935 | Condon |
| 2,235,181 | A | 3/1941 | Thiel |
| 2,273,570 | A | 2/1942 | Greenless |
| 2,295,176 | A | 9/1942 | Kelly |
| 2,414,223 | A | 1/1947 | De Virgilis |
| 2,457,348 | A | 12/1948 | Chambers |
| 2,511,971 | A | 6/1950 | Dalton |
| 2,562,687 | A | 7/1951 | Anderson |
| 3,522,584 | A | 8/1970 | Talbot |
| 3,596,079 | A | 7/1971 | Clark |
| 3,883,732 | A | 5/1975 | Peterson |
| 4,041,301 | A | 8/1977 | Pelchat |
| 4,143,368 | A | 3/1979 | Route et al. |
| 4,205,325 | A | 5/1980 | Haygood et al. |
| 4,258,352 | A | 3/1981 | Lipschutz |

(Continued)

FOREIGN PATENT DOCUMENTS

DE     2634372     2/1978

(Continued)

*Primary Examiner*—Sandra O'Shea
*Assistant Examiner*—Mark Tsidulko
(74) *Attorney, Agent, or Firm*—McGarry Bair PC

(57) ABSTRACT

The invention relates to an external rearview mirror having an illumination source capable of illuminating various portions of an vehicle and the surrounding area depending upon the operational status of the vehicle. The illumination source is adjustable to selectively illuminate predetermined areas of the vehicle and the surrounding area. Two sets of light-emitting diodes of selected colors can be arranged and controlled so that the first set of LEDs can be selectively illuminated as a turn signal indicator, and the first set and second set can be selectively illuminated so that the combined illumination forms a white light suitable for illumination, such as a "puddle light" or backup light.

27 Claims, 29 Drawing Sheets

U.S. PATENT DOCUMENTS

| | | | |
|---|---|---|---|
| 4,274,078 A | 6/1981 | Isobe et al. |
| 4,281,899 A | 8/1981 | Oskam |
| 4,342,210 A | 8/1982 | Denningham |
| 4,446,380 A | 5/1984 | Moriya et al. |
| 4,475,100 A | 10/1984 | Duh |
| 4,569,002 A | 2/1986 | English |
| 4,583,155 A | 4/1986 | Hart |
| 4,626,084 A | 12/1986 | Kunai |
| 4,646,207 A | 2/1987 | Levin |
| 4,661,800 A | 4/1987 | Yamazaki |
| 4,688,036 A | 8/1987 | Hirano et al. |
| 4,693,571 A | 9/1987 | Kimura et al. |
| 4,733,336 A | 3/1988 | Skogler et al. |
| 4,772,989 A | 9/1988 | Haraden |
| 4,807,096 A | 2/1989 | Skogler et al. |
| 4,808,968 A | 2/1989 | Caine |
| 4,809,137 A | 2/1989 | Yamada |
| 4,851,970 A | 7/1989 | Bronder |
| 4,866,417 A | 9/1989 | DeFino et al. |
| 4,868,722 A | 9/1989 | Haraden |
| 4,881,148 A | 11/1989 | Lambropoulos et al. |
| 4,890,907 A | 1/1990 | Vu et al. |
| 4,916,430 A | 4/1990 | Vu et al. |
| 5,014,167 A | 5/1991 | Roberts |
| 5,017,903 A | 5/1991 | Krippelz, Sr. |
| 5,038,255 A | 8/1991 | Nishihashi et al. |
| 5,049,867 A | 9/1991 | Stouffer |
| 5,059,015 A | 10/1991 | Tran |
| 5,109,214 A | 4/1992 | Heidman, Jr. |
| 5,113,182 A | 5/1992 | Suman et al. |
| 5,132,882 A | 7/1992 | Alder |
| 5,151,824 A | 9/1992 | O'Farrell |
| 5,179,471 A | 1/1993 | Caskey et al. |
| 5,206,562 A | 4/1993 | Matsuno et al. |
| 5,207,492 A | 5/1993 | Roberts |
| 5,223,814 A | 6/1993 | Suman |
| 5,287,101 A | 2/1994 | Serizawa |
| 5,303,130 A | 4/1994 | Wei et al. |
| 5,313,335 A | 5/1994 | Gray et al. |
| 5,371,659 A | 12/1994 | Pastrick et al. |
| 5,402,103 A | 3/1995 | Tashiro |
| 5,436,741 A | 7/1995 | Crandall |
| 5,497,305 A | 3/1996 | Pastrick |
| 5,497,306 A | 3/1996 | Pastrick |
| 5,499,169 A | 3/1996 | Chen |
| 5,587,699 A | 12/1996 | Faloon et al. |
| 5,624,176 A | 4/1997 | O'Farrell et al. |
| 5,669,699 A | 9/1997 | Pastrick et al. |
| 5,669,704 A | 9/1997 | Pastrick |
| 5,669,705 A | 9/1997 | Pastrick et al. |
| 5,788,357 A | 8/1998 | Muth |
| 5,823,654 A | 10/1998 | Pastrick et al. |
| 5,863,116 A | 1/1999 | Pastrick |
| 5,871,275 A | 2/1999 | O'Farrell et al. |
| 5,879,074 A | 3/1999 | Pastrick et al. |
| 5,886,838 A | 3/1999 | Kuramoto |
| 5,938,320 A | 8/1999 | Crandall |
| 6,045,243 A | 4/2000 | Muth |
| 6,074,077 A | 6/2000 | Pastrick et al. |
| 6,076,948 A | 6/2000 | Bukosky et al. |
| 6,086,229 A | 7/2000 | Pastrick |
| 6,099,153 A | 8/2000 | Zimmermann et al. |
| 6,099,155 A | 8/2000 | Pastrick |
| 6,132,072 A * | 10/2000 | Turnbull et al. ............ 361/494 |
| 6,139,171 A | 10/2000 | Waldmann |
| 6,139,176 A | 10/2000 | Hulse et al. |
| 6,149,287 A | 11/2000 | Pastrick et al. |
| 6,176,602 B1 * | 1/2001 | Pastrick et al. ............ 632/494 |
| 6,206,553 B1 | 3/2001 | Boddy et al. |
| 6,227,689 B1 * | 5/2001 | Miller ........................ 362/494 |
| 6,250,783 B1 | 6/2001 | Stidham et al. |
| 6,276,821 B1 | 8/2001 | Pastrick |
| 6,280,068 B1 | 8/2001 | Martens et al. |
| 6,280,069 B1 | 8/2001 | Pastrick |
| 6,299,333 B1 | 10/2001 | Pastrick |
| 6,315,437 B1 | 11/2001 | Katz et al. |
| 6,367,957 B1 | 4/2002 | Hering et al. |
| 6,416,208 B2 | 7/2002 | Pastrick |
| 6,474,853 B2 | 11/2002 | Pastrick |
| 6,494,602 B2 | 12/2002 | Pastrick |
| 2001/0036081 A1 * | 11/2001 | Gilbert et al. .............. 362/494 |

FOREIGN PATENT DOCUMENTS

| | | |
|---|---|---|
| DE | 3614882 A1 | 11/1987 |
| DE | 3635471 A1 | 4/1988 |
| DE | 3635473 A1 | 4/1988 |
| DE | 3803510 | 9/1988 |
| DE | 9101029.2 | 5/1991 |
| DE | 4141208 A1 | 6/1993 |
| DE | 949409566.3 | 9/1994 |
| DE | 19538771 A1 | 4/1997 |
| DE | 29702746 U1 | 5/1997 |
| DE | 19736482 A1 | 2/1998 |
| EP | 0525541 | 11/1994 |
| EP | 0738627 | 10/1996 |
| EP | 0820900 | 1/1998 |
| FR | 1461419 | 12/1966 |
| FR | 2612136 | 9/1988 |
| FR | 2618397 | 1/1989 |
| GB | 1555541 | 11/1979 |
| GB | 2129749 A | 5/1984 |
| GB | 2154969 A | 9/1985 |
| GB | 2161440 A | 1/1986 |
| GB | 2266870 A | 11/1993 |
| GB | 2275329 A | 8/1994 |
| GB | 2316379 A | 2/1998 |
| JP | 58188733 A | 11/1983 |
| JP | 60161646 | 10/1985 |
| JP | 61188242 | 8/1986 |
| JP | 61218452 | 9/1986 |
| JP | 62191246 | 8/1987 |
| JP | 0218248 | 9/1987 |
| JP | 0239273 | 9/1989 |
| JP | 03050044 | 3/1991 |
| JP | 08142745 A | 6/1996 |
| JP | 09095177 | 4/1997 |
| WO | WO 89/01425 | 2/1989 |

\* cited by examiner

| | | OPERATOR ACTION | | | | | | | |
|---|---|---|---|---|---|---|---|---|---|
| | | KEY FOB "UNLOCK" | APPROACH VEHICLE | OPEN DOOR | IGNITION "ON" | TRANSMISSION "REVERSE" | TRANSMISSION "DRIVE" | IGNITION "OFF" | KEY FOB "LOCK" |
| MIRROR ACTION | Mirror Housing POSITION | IN | IN | IN | OUT | OUT | OUT | IN | IN |
| | Mirror Tilt POSITION | NOM | NOM | NOM | NOM | DOWN | NOM | NOM | NOM |
| | Light ON/OFF | ON STROBE MODE | ON | OFF | OFF | ON | OFF/ TURN SIGNAL | OFF | OFF |
| | Light POSITION | FORWARD | FORWARD /NEUTRAL | FORWARD /NEUTRAL | REAR | REAR | NEUTRAL /REAR | REAR | REAR |

Fig. 11

VEHICULAR MIRROR ASSEMBLY INCORPORATING MULTIFUNCTIONAL ILLUMINATION SOURCE

CROSS REFERENCE TO RELATED APPLICATIONS

This application claims the benefit of U.S. provisional application Ser. No. 60/319,174, filed Apr. 9, 2002; 60/319,175, filed Apr. 9, 2002; and 60/319,323, filed Jun. 18, 2002, which are incorporated herein in their entirety.

BACKGROUND OF INVENTION

1. Field of the Invention

The invention relates to an external vehicle mirror and, more particularly, to an external vehicle mirror having multiple illumination modes. In one aspect, the invention relates to vehicle external mirrors incorporating an illumination device mounted for movement between multiple functional positions. In another aspect, the invention relates to an assembly of light-emitting diodes of different colors for selectively producing, in combination, colored light for different vehicular functions.

2. Description of the Related Art

External mirrors are ubiquitous for contemporary motor vehicles and have long been used to aid the driver in operating the vehicle, especially in improving the rearward view of the driver. Over time, more and more functionality has been incorporated into the external mirrors. For example, it is common to pivot or fold the external mirror against the vehicle body and prevent the jarring of the mirror when the vehicle is not operated. The mirror-folding function can incorporate a power assist, such as that disclosed in U.S. Pat. No. 5,684,646, which is incorporated by reference.

Functionality can also be added by incorporating lights for illuminating portions of the vehicle or the surrounding area into external mirrors, such as are disclosed in U.S. Pat. Nos. 5,371,659, 6,176,602, 6,086,229, and 5,871,275, which are incorporated in their entirety herein by reference. These lights are used for several different illumination modes. One mode of illumination is a downwardly directed illumination source that illuminates a portion of the vehicle, generally one of the front door areas, adjacent the external mirror. This type of downwardly directed illumination source is often referred to as a "puddle light." Another illumination mode is accomplished by a rearwardly directed light, which illuminates the portion of the vehicle behind the mirrors and is useful in reverse operation of the vehicle. This mode of illumination is often referred to as a "rear assist light." An additional illumination mode comprises illumination sources incorporated into the external mirror to perform a turn signal indicator function, referred to as a "turning mode."

Since many of the illumination modes are very useful and convenient to the vehicle operator, it is desirable to incorporate as many illumination modes in an external mirror as possible. Unfortunately, several characteristics of the external mirror and the vehicle marketplace make it difficult to incorporate multiple illumination modes in a single external mirror.

External mirror assemblies are typically constructed to minimize their cross-sectional profile to reduce aerodynamic drag, which can improve vehicle fuel efficiency and reduce the associated wind-generated noise of the mirror. The tendency to reduce or minimize the cross-sectional profile of the mirror results in little available interior volume in the mirror assembly for locating the light assemblies needed for the multiple illumination modes. To the extent that interior volume is available for mounting the illumination source, the location of the available interior volume is not always at a location where the illumination source can illuminate the desired area. The undesirable location of available interior volume is exacerbated when multiple modes of illumination are desired.

The characteristics of the vehicle parts manufacturing marketplace in general and the exterior mirrors specifically impose additional constraints and hurdles for providing a suitable multiple illumination mode external mirror. The exterior mirror marketplace has conflicting characteristics: increased functionality versus reduced cost and reduced part count. Reduced part count for the most part is related to cost. Thus, while there is a desire for multiple illumination modes, they typically must be accomplished with minimal cost and part count increases.

Illumination devices in vehicles have typically employed incandescent lamps, which typically have a limited useful life, lack ease of replacement, and have a tendency to burn out, particularly in a harsh environment. Furthermore, incandescent lamps tend to be relatively large. Thus, incandescent lamps have been replaced with light-emitting diodes (LEDs). However, there are limitations in doing so. Significantly, it is difficult to emit white light from an LED, and, although it is possible to do so, the white-light LEDs can be expensive. Use of LEDs is disclosed in U.S. Pat. No. 6,132,072 to Turnbull et al., issued Oct. 17, 2000, which uses a mixture of amber and blue-green LEDs to produce an "effective" or synthetic white light. A lighting device for motor vehicles utilizing LEDs is also disclosed in U.S. Pat. Nos. 6,347,880 and 6,152,590.

SUMMARY OF INVENTION

In one aspect, the invention relates to a vehicular mirror system comprising: a vehicular mirror assembly adapted to be mounted to a vehicle, the vehicular mirror assembly having a reflective element mounted therein; said vehicular mirror assembly comprising an illumination device, said illumination device projecting emitting light when electrically powered, the illumination device moveable between at least a first position to perform a first illumination function and a second position to perform a second illumination function; said first illumination function comprising one function selected from the group consisting of a ground illumination function, a signal light function, and a reverse light function; and said second illumination function comprising another function selected from the group consisting of a ground illumination function, a signal light function, and a reverse light function.

In another aspect, the invention relates to a vehicular mirror system comprising: a base adapted to be mounted to a vehicle; a vehicular mirror assembly movably mounted to the base for movement between an extended position and a folded position, the vehicular mirror assembly having an outwardly-facing reflective element mounted therein; and an illumination device mounted to the vehicular mirror assembly for emitting light, the illumination device being mounted for movement between at least a first position to perform a first illumination function and a second position to perform a second illumination function.

In a further aspect of the invention, a vehicular mirror system comprises a vehicular mirror assembly adapted to be mounted to a vehicle, the vehicular mirror assembly having a reflective element mounted therein; and an illumination device mounted to the vehicular mirror assembly to direct light outwardly therefrom, the illumination device being selectively actuatable to emit illumination for performing a first illumination function and a second illumination function, the illumination device comprising a first set of light-emitting diodes emitting light of a first color and a second set of light-emitting diodes emitting light of a second color, the first set of light-emitting diodes being selectively operable to emit light of a first color to perform the first illumination function, and the first set of light-emitting diodes and the second set of light-emitting diodes being selectively operable in combination to emit light of a second color to perform the second illumination function.

Various embodiments of the invention are also contemplated. An actuator can be operably interconnected to the illumination device to move the illumination device between the first and second positions. A support can be provided which extends from the vehicular mirror assembly for mounting the vehicular mirror assembly to the vehicle, and the illumination device is mounted to one of the vehicular mirror assembly and the support. The illumination device can comprise a light source which is moveable between at least the first position and the second position. The light source can be at least one incandescent light. The light source can be at least one light-emitting diode. The illumination device can further comprise an electric motor for moving the light source between at least the first position and the second position. The illumination device can comprise a fixed light source and a reflector that is moveable between at least the first position and the second position. The reflector can comprise a convex mirror.

The actuator can be operably interconnected to the illumination device to move the illumination device between the first and second positions. The illumination device can comprise a light source which is moveable between at least the first position and the second position. The illumination device can further comprise a reflector that is moveable between at least the first position and the second position. A driver can be provided that operably couples the at least one of the vehicular mirror assembly and the base and the reflector such that the movement of the vehicular mirror assembly between the extended position and the retracted position moves the second reflective element between the first position and the second position.

The combination of the colors emitted by the first and second sets of light-emitting diodes can be a synthetic white light. The first illumination function can comprise one function selected from the group consisting of a ground illumination function, a signal light function, and a reverse light function. The second illumination function can comprise another function selected from the group consisting of a ground illumination function, a signal light function, and a reverse light function.

BRIEF DESCRIPTION OF DRAWINGS

In the drawings:

FIG. 11 is a logic control table illustrating the status of the various mirror assembly components for various operational conditions of the vehicle.

DETAILED DESCRIPTION

Figure 1:
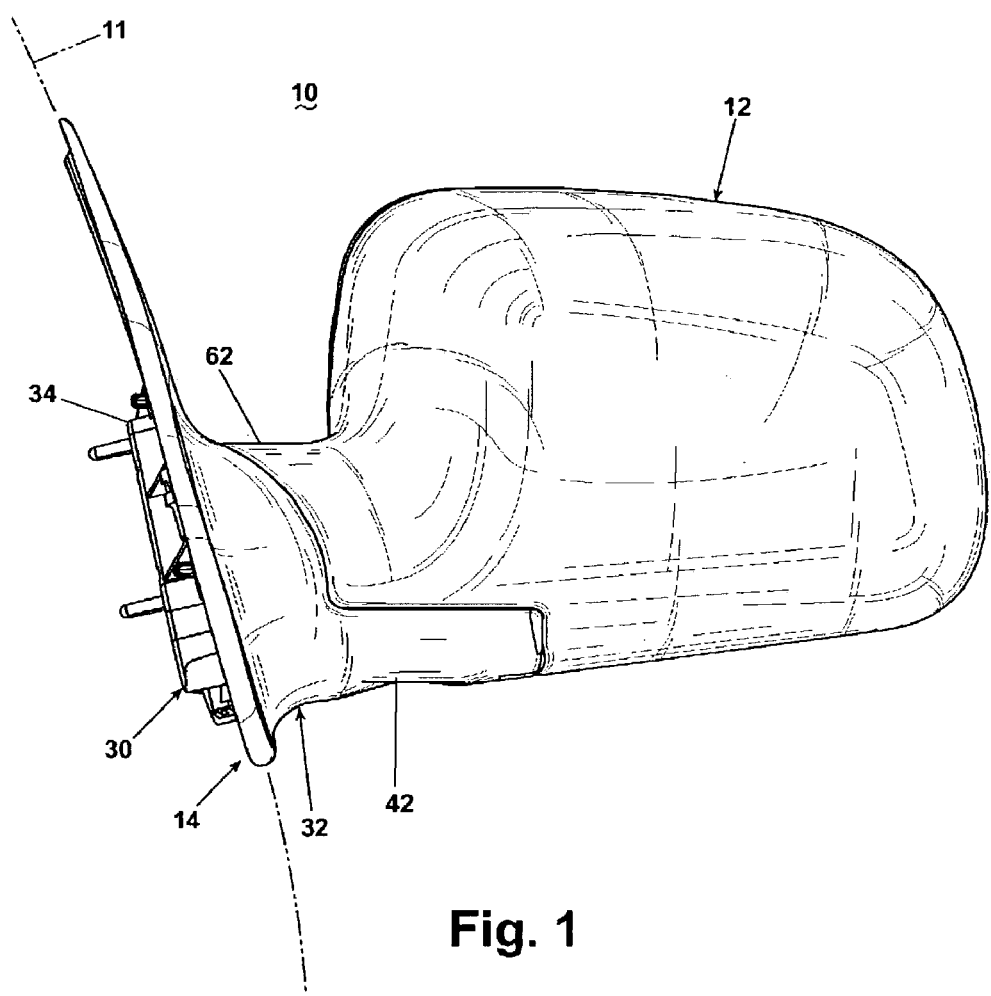
FIG. 1 is a front perspective view of a first embodiment of an exterior mirror assembly comprising a mirror housing rotatably mounted to a mirror support, which is adapted to be connected to a motor vehicle, and a lens mounted to a lower surface of the mirror support and covering an illumination source.
Figure 2:
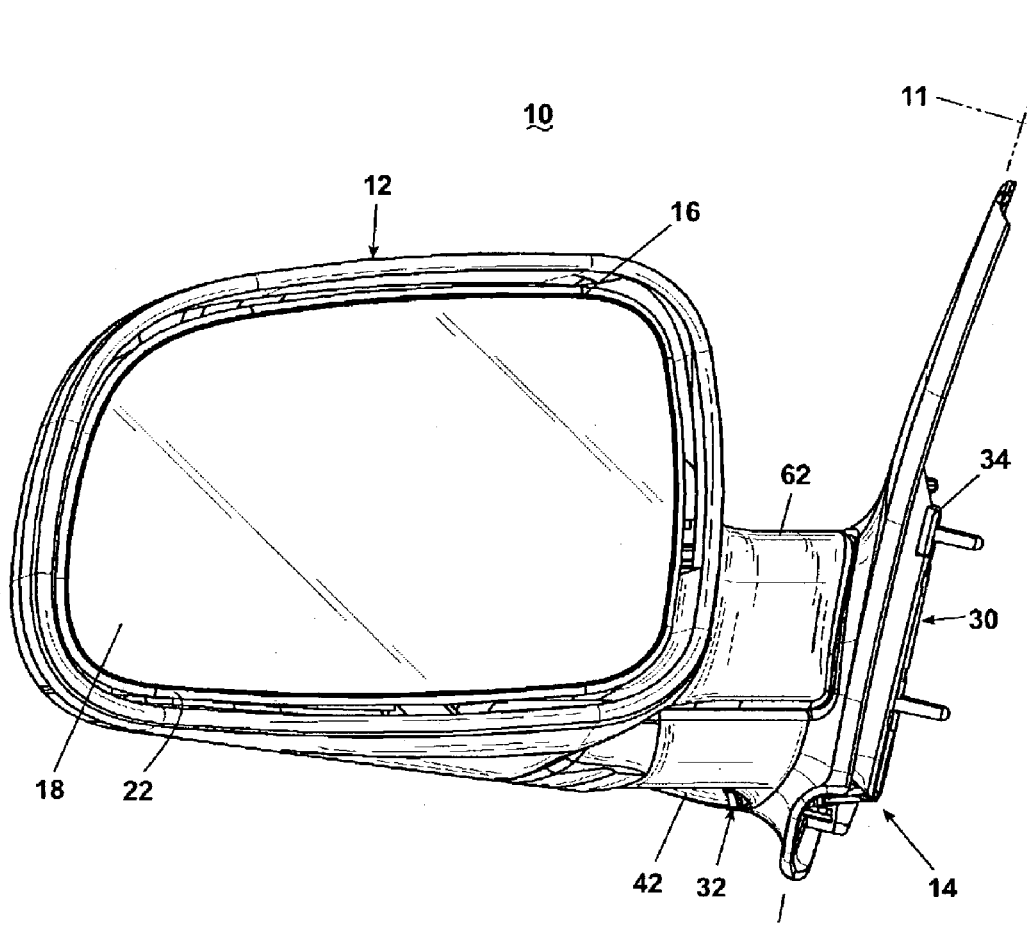
FIG. 2 is a rear perspective view of the exterior mirror assembly of FIG. 1 and illustrates a mirror mounted within the mirror housing.
Figure 3:
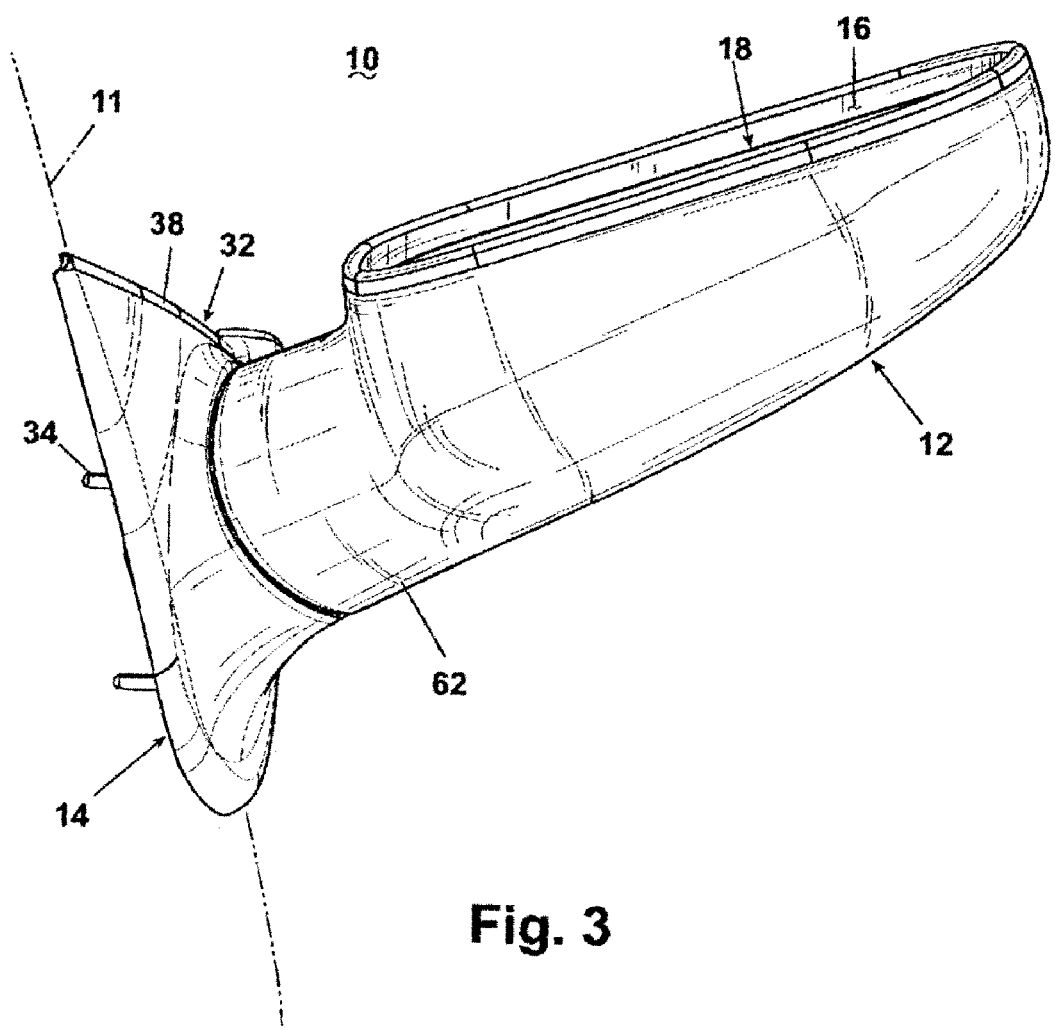
FIG. 3 is a top perspective view of the exterior mirror assembly of FIGS. 1 and 2.
Figure 4:
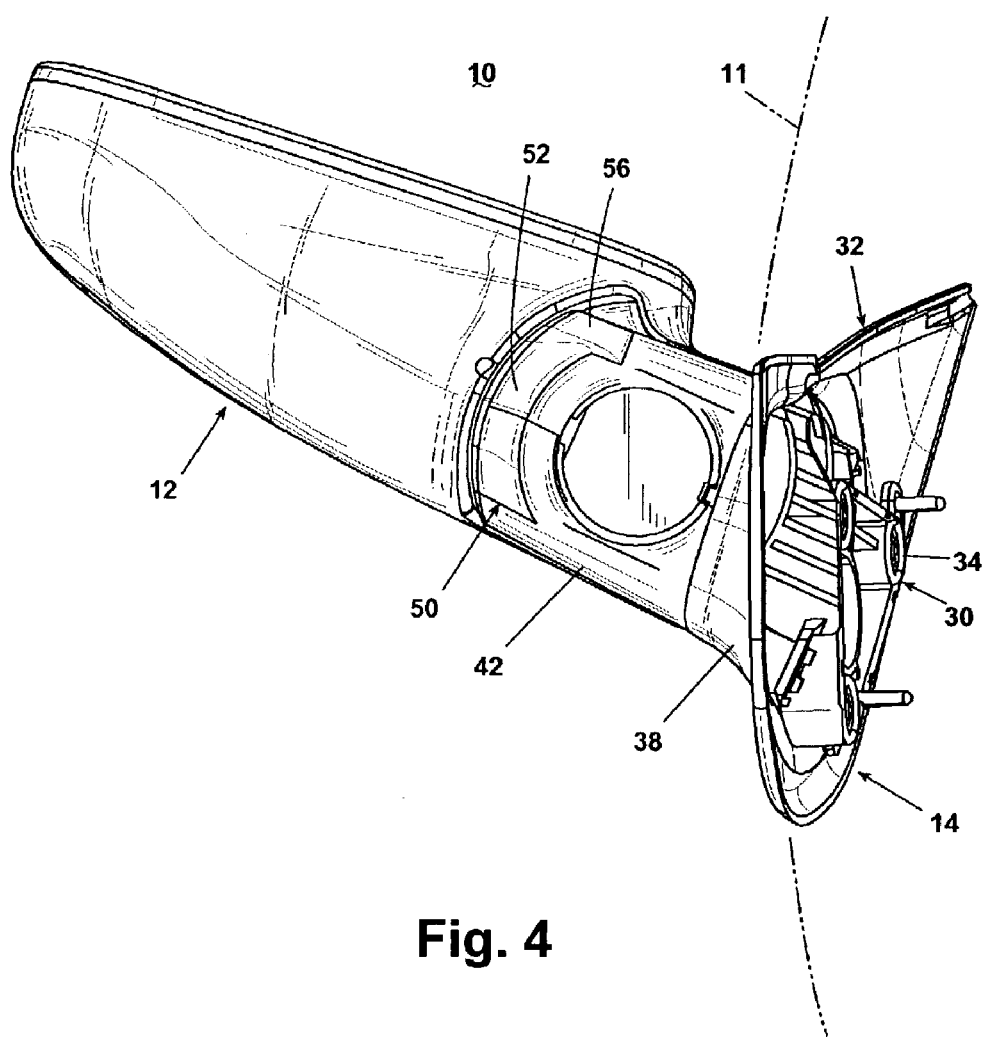
FIG. 4 is a bottom perspective view of the exterior mirror assembly of FIGS. 1–3.

FIGS. 1–4 illustrate a first embodiment of a vehicular mirror system comprising an external mirror assembly 10 of the type suitable for mounting to the exterior of a motor vehicle 11. The external mirror assembly 10 comprises a breakaway moveable portion 12 pivotally mounted to fixed support portion 14, which is adapted to be mounted to the vehicle 11. The moveable portion 12 is closed on a forward side and defines a recess 16 on its rear side in which is received a mirror 18.

Figure 5:
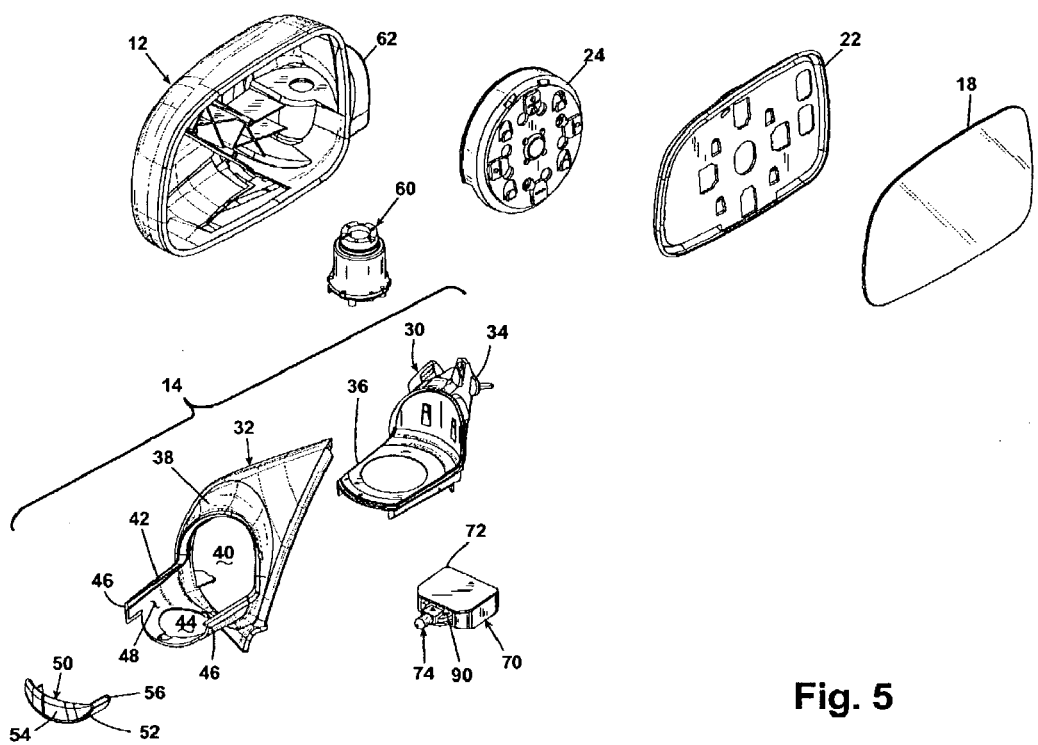
FIG. 5 is an exploded view of the mirror assembly of FIG. 1 illustrating the major components including the mirror housing rotatably mounted to the mirror support by a pedestal motor housing, an illumination source located in the mirror support, and a mirror assembly.

Referring to FIG. 5 specifically, and FIGS. 1–4 generally, the mirror recess 16 of the moveable portion 12 is preferably sized to receive a mirror positioning mechanism comprising a mirror reflective element 22, preferably an electrochromic mirror reflective element, mounted to a drive unit 24, which is sometimes referred to as a mirror actuator, or a "power pack." The drive unit 24 mounts to the interior of the moveable portion 12 in a well-known manner to provide for adjusting the tilt of the reflective element 22 about at least two axes, and is operably connected to the vehicle's controller (not shown). The drive unit 24 is often used to adjust the tilt of the mirror depending on the operational status of the vehicle. For example, if the vehicle is operated in reverse, the vehicle controller automatically tilts the mirror downwardly, usually in response to the vehicle being placed in reverse, to provide the operator with a better view of the rear of the vehicle (and such as is disclosed in U.S. Pat. No. 5,871,275, which is incorporated in its entirety herein). If the vehicle is operated in forward, the mirror is tilted upwardly to provide the operator with a rearward view of the road and traffic advancing from behind.

The mirror 18 is mounted within the reflective element 22 thereby permitting the adjustment of the mirror 18 through the adjustment of the reflective element 22 by the drive unit 24. The mirror 18, the reflective element 22, and the drive unit 24 and its operation, are all well-known and will not be described in greater detail.

Referring to FIG. 5, the fixed support portion 14 comprises a support bracket 30 and a complementary trim cover 32. The support bracket 30 includes a mounting portion 34 for securing the support bracket 30 to the vehicle 11 in a generally conventional manner and a support base 36 extending laterally away from the mounting portion 34 in a generally horizontal plane when the support bracket 30 is mounted to the vehicle 11.

The trim cover 32 comprises a shoulder portion 38 and defines a through opening 40 in which the support base 34 is received when the trim cover 32 is mounted to the support bracket 30. An open-top sleeve 42 extends laterally away from the shoulder 38 and defines a sleeve opening 44 therethrough. The sleeve 42 terminates in opposing sidewalls 46 that couple with the edges of the support base 34 when the trim cover 32 is mounted to the support bracket 30.

The sleeve 42 is sized such that, when the support base 36 is coupled with the sidewalls 46, a gap remains between the support base 36 and the sleeve 42 to define an illumination source recess 48 having a laterally-oriented opening that is closed by a lens 50, which removably communicates, such as with a snap-fitting or suitable threaded fasteners, with the end of the sleeve 42 to close the illumination source recess 48.

The lens 50 comprises a lower wall 52 and an arcuate end wall 54, which transitions into a lateral wall 56 facing rearward. There is no corresponding lateral wall portion in the front edge of the arcuate wall 54, although it would be within the scope of the invention for such a lateral extending portion to be provided.

A cylindrical mirror pivot 60 mounts to the support base 36 and is received within an arm portion 62 of the moveable portion 12 to pivotally mount the housing 12 to the fixed support portion 14. The pivot 60 has a generally cylindrical shape with a hollow interior in which is received an electric motor (not shown) for rotating the mirror pivot 60 to rotate the moveable portion 12 from an extended position, wherein the moveable portion 12 is substantially perpendicular to the vehicle 11, to a retracted position, wherein the moveable portion 12 is substantially parallel to the vehicle 11. The mirror pivot 60 is well known and is disclosed in U.S. Pat. No. 5,684,646, which is incorporated herein by reference. Therefore, the mirror pivot 60 will not be described in further detail.

An illumination device 70 is received within the illumination source recess 48 and comprises a housing 72 from which extends an illuminating element 74. The illumination device 70 is positioned within the illumination source recess 48 such that the light emitted by the illuminating element 74 passes through the lens 50 and is visible exteriorly of the mirror assembly 10.

The illuminating element 74 is preferably an incandescent lamp. However, other suitable light emitting sources, such as a light-emitting diode or a fluorescent source or a neon source or a laser source or another non-incandescent light source, can be used without departing from the scope of this invention.

Figure 6:
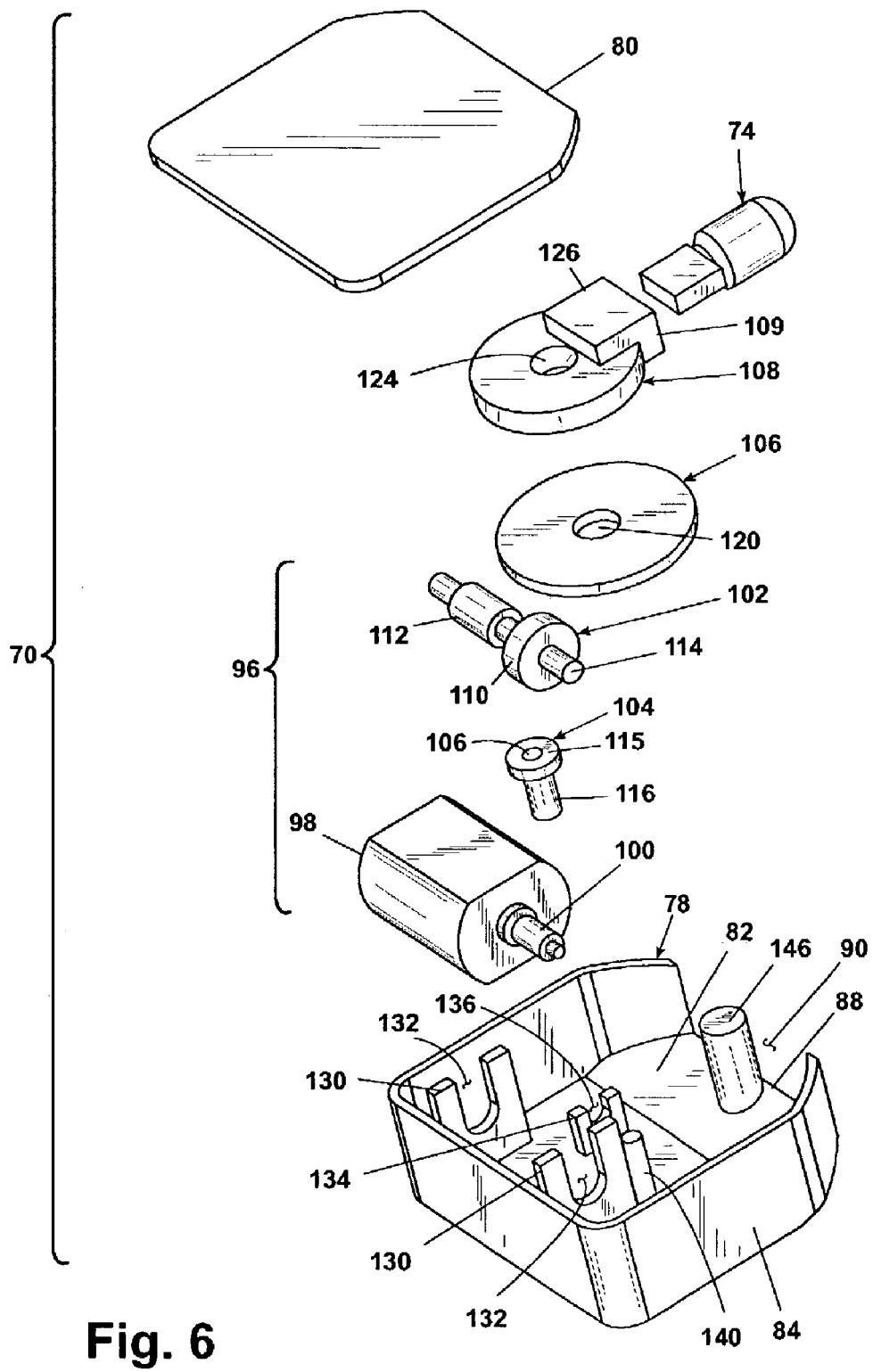
FIG. 6 is an exploded view of the illumination source, which comprises a drive motor, drive gears, transmission and light element all of which are connected to a housing for the illumination source.

Referring to FIG. 6, the illuminating assembly 70 is shown in greater detail. The housing 72 comprises a base 78 and a cover 80. The base 78 is a somewhat rectilinear body and comprises a bottom wall 82 from which orthogonally extends a peripheral wall 84. The bottom wall 82 has a generally rectilinear shape. The peripheral wall 84 extends substantially about the periphery of the bottom wall 82, except along a portion 88. It will be understood that the base 78 can assume other configurations suitable for enclosing the illuminating assembly 70 in the illumination source recess 48.

The cover 80 is a plate-like a body having a shaped complementary to the shape of the bottom wall 82, mounts to the upper edge of the peripheral sidewall 84 to form a recess in the housing 72, and defines a slot 90 between the portion 88 and the cover 80. The light element 74 extends through the slot 90.

A light element drive mechanism 96 is mounted within the interior of the housing 72 and is actuated to move the light element 74 through an arcuate range of motion limited by the extent of the slot 90. The drive mechanism 96 comprises an electric motor 98 (or another motive element such as a shape metal alloy motive element, such as disclosed in U.S. Pat. No. 6,364,496 or an electroactive polymer motive element such as is disclosed in U.S. Pat. No. 6,376,971 suitable for energizing by the vehicle's electrical power system, and having a geared output shaft 100 that is coupled to a drive gear 106 by a transmission comprising a transition gear 102 and a transfer gear 104. The drive gear 106 couples the transition gear 104 to a light mount 108, which mounts the light element 74.

The transition gear 102 comprises a large diameter input gear 110 and a small diameter output gear 112, both of which are coaxially mounted to an axle 114. The pitch of the teeth of the output gear 112 is skewed relative to a longitudinal axis of the axle 114 and the teeth are complementary to the teeth of the drive gear 106 to effect a change in the rotation from a generally horizontal rotation of the transition gear 102 to a generally vertical rotation of the drive gear 106.

The transfer gear 104 comprises an input gear 115 adapted to be operably enmeshed with the input gear 110, and an output gear 16 adapted to be operably enmeshed with the motor output gear 100. The transfer gear 104 is provided with a coaxial bore 105 extending therethrough. The output gear 116 is smaller in diameter than the input gear 115 to form a gear reduction from the motor output gear 100 to the drive gear 106.

The drive gear 106 is generally disk-shaped with an axial opening 120. The light mount 108 is similarly disk-shaped, with an opening 124. A light socket 126 is fixedly mounted to the light mount 108 and receives the light element 74 in a conventional manner. A portion 109 of the light socket 126 extends radially away from the opening 124 to overhang the light mount 108 along a portion of the circumference thereof. Although not shown in the drawings, the light socket 126 is connected to a source of power for supplying the light element 74 with the necessary electrical power for illumination.

Figure 7:
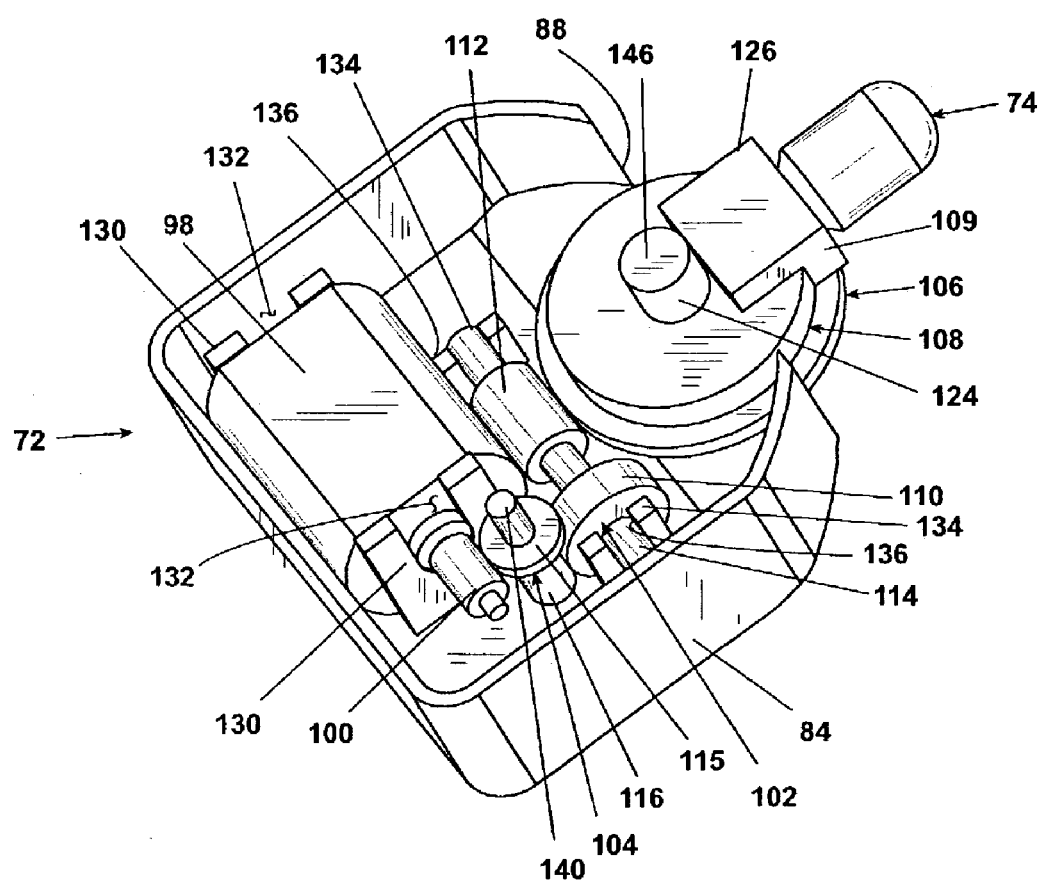
FIG. 7 is a perspective view of the assembled components of the illumination source of FIG. 6, with an upper housing cover removed for clarity.

Referring to FIGS. 6 and 7, various suitable mounting structures, such as stops, posts, bosses, and cradles, are provided on or formed in the bottom wall 82 of the housing 72 for fixedly and cooperatively mounting the components of the drive mechanism 96. A pair of spaced walls 130 having corresponding notches 132 form a motor cradle for supporting the electric motor 98. Similarly, a pair of spaced walls 134 having notches 136 form a transition gear cradle for supporting the transition gear 102. A first post 140 extending orthogonally from the bottom wall 82 is adapted to rotatably mount the transfer gear 104. Similarly, a second post 146 extending orthogonally from the bottom wall 82 is adapted to rotatably mount the drive gear and the light mount 108.

As best seen in FIG. 7, the motor 98 is mounted to the housing 72 by a portion of the motor resting in the motor cradle so that the output shaft 100 is parallel to the bottom wall 82 and can freely rotate. The transition gear 102 is rotatably mounted to the housing 72, parallel to the output shaft 100, by the axle 114 being received within the transition gear cradle. The transfer gear 104 is slidably mounted onto the post 140 until the output gear 116 abuts the bottom wall 82. Similarly, the drive gear 106 is slidably mounted onto the post 146 by the post 146 being received through the axial opening 120 until a lower surface of the drive gear 106 abuts the bottom wall 82. The light mount 108 is similarly mounted to the post 146.

The drive gear 106 and the light mount 108 are operably coupled together through suitable means such as adhesives, fasteners, or an interference fit, such that the movement of the drive gear 106 results in the corresponding movement of the light mount 108. Preferably the light mount 108 is of a smaller diameter than the drive gear and the portion 109 of the light receptacle 126 overhanging the light mount 108 rests on and is attached to the drive gear 106.

Figure 8:
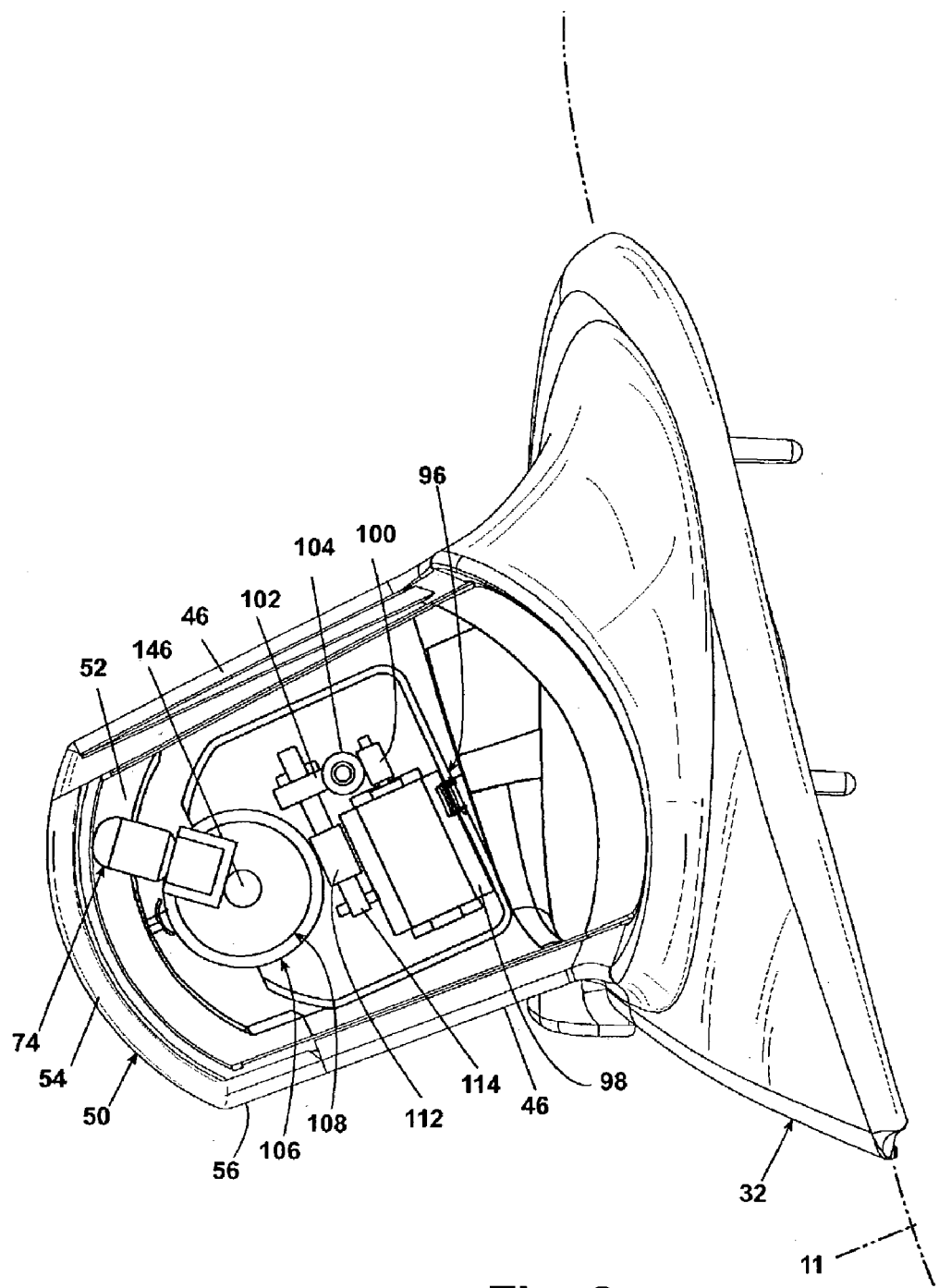
FIG. 8 is a top perspective view of the assembled illumination source with the housing cover removed and positioned within the mirror support, and the light element shown in a forward directed position.
Figure 9:
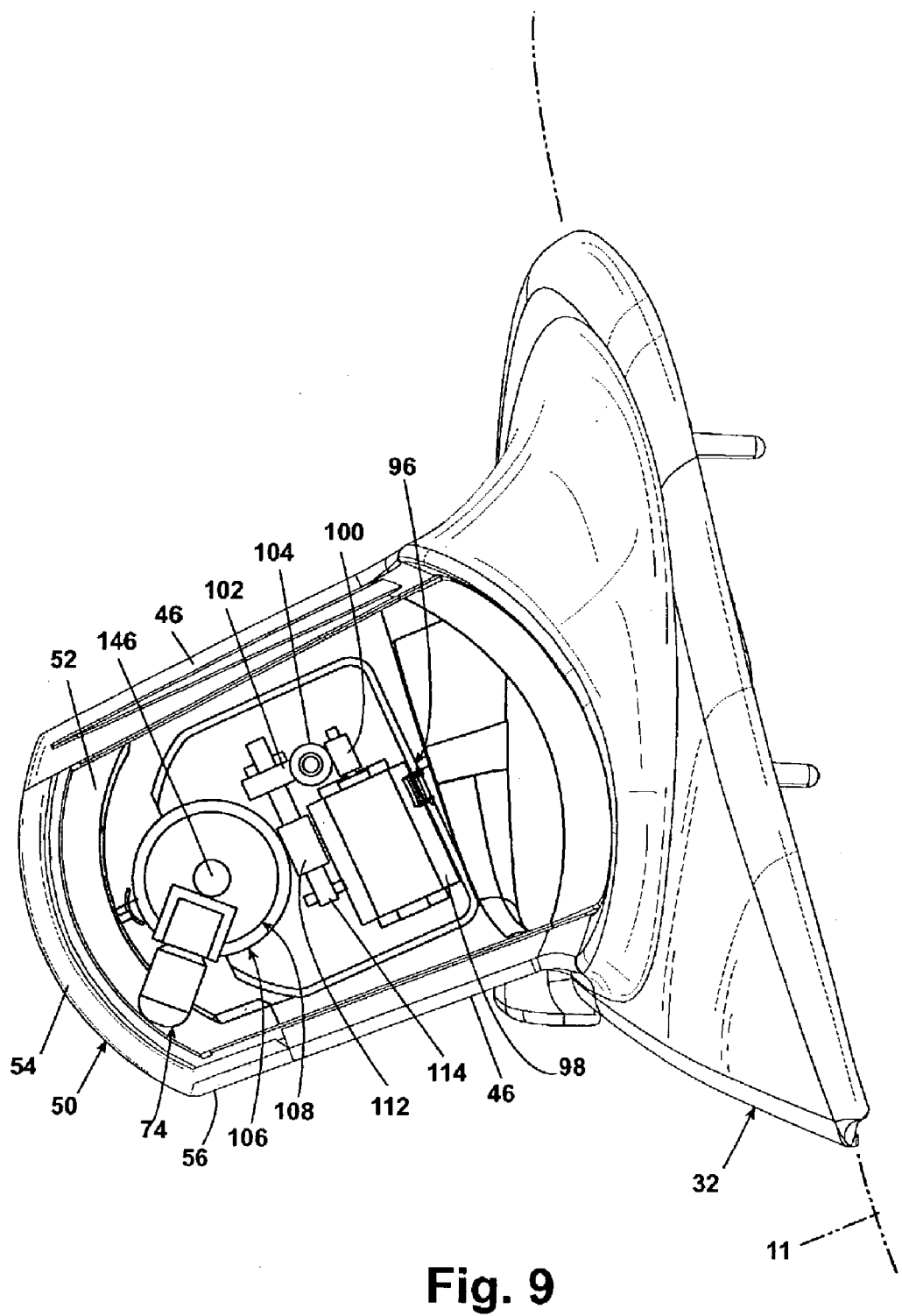
FIG. 9 is a top perspective view identical to FIG. 8 except that the light element is located in a reward position.
Figure 10:
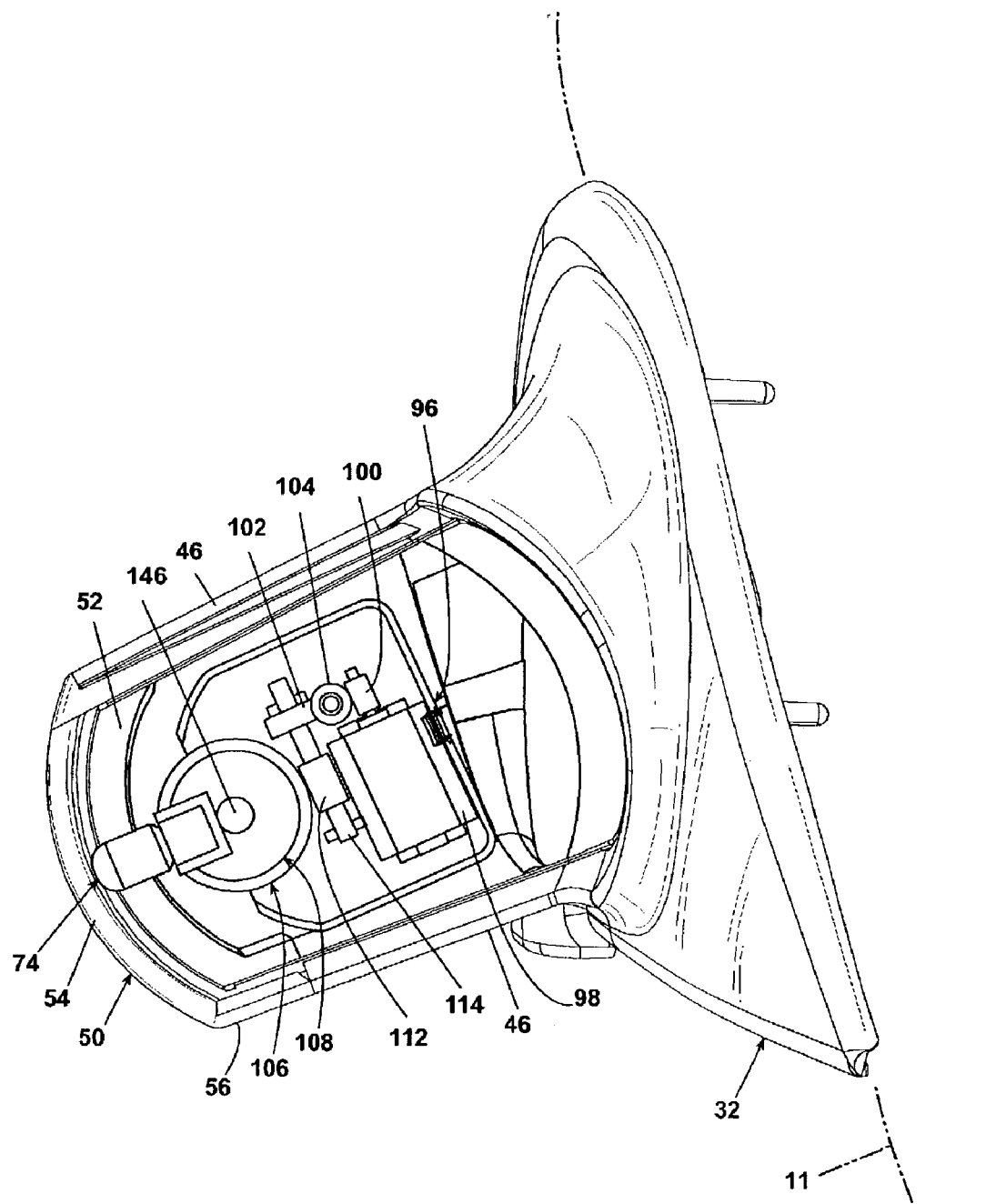
FIG. 10 is a top perspective view identical to FIG. 8 except that the light element is located in a neutral position, between the forward and rearward positions.

Referring to FIGS. 8–10, the operation of the drive mechanism 96 and the operational range of the light element 74 is briefly described. The control of power to the electric motor 98 and the light element 74 is handled by the vehicle control system in a well-known manner and is not germane to the invention. Therefore, the specific type of control system and wiring for the electric motor 98 and the light element 74 will not be described in detail. To understand the invention, it is only necessary to know that the electric motor can be turned on and off by the vehicle controller as desired to effect the movement of the light element 74.

FIGS. 8–10 are partial assembly views of the mirror assembly 10 with the support 36 and the cover 80 removed to show the position of the light element 74 in various modes of illumination. FIG. 8 illustrates the light element 74 in a forward position where the light element 74 is generally directed toward the rear end of the sidewall 54 In the forward position, the light element 74 generally illuminates a portion of the vehicle 11 forward of the door, along with a portion of the door. Such a mode of illumination is contemplated as being useful in aiding the operator in locating the vehicle 11.

FIG. 9 illustrates the light element 74 in a rearward position where the light element 74 is generally directed toward the lateral extending portion 56 of the lens 50. and is useful in illuminating portions of the vehicle 11 and the surrounding area located rearwardly of the mirror assembly 10.

FIG. 10 illustrates the light element 74 in a neutral position, which is located approximately midway between the forward and rearward positions shown in FIGS. 8 and 9, respectively. In the neutral position, the light element 74 will predominantly illuminate the vehicle door and the surrounding area of the vehicle and is well-suited for a puddle mode of lighting. The light element 74 can also be used to perform a turn signal function when in the neutral position through suitable operational control from the vehicle control system.

While the preferred embodiment discloses the transmission as comprising the transition gear 102 and transfer gear 104, other suitable transmissions can be used. For example, a belt could connect the motor 98 to the drive gear 106. There could also be a direct connection between the motor output gear 100 and the drive gear 106, which would reduce the number of gears. Depending on the type of motor, such a configuration may require additional electronic control of the motor.

FIG. 11 schematically illustrates the status of the various mirror assembly components for multiple vehicle operations. It is anticipated that the operator of the vehicle will activate several of the vehicle operational modes by using a key fob in conjunction with the controller for the vehicle. Since a key fob and vehicle controller combination are well-known to one of ordinary skill in the art and are not germane to the invention, they will not be described other than by general reference. Of course, it will be understood that this invention can work equally as well in a "passive entry" system such as that disclosed in U.S. Pat. No. 5,497,305, which is incorporated in its entirety herein.

The selected mirror status conditions are listed on the vertical axis of FIG. 11 and include the: MIRROR HOUSING POSITION, MIRROR TILT POSITION, LIGHT ON/OFF status, and the LIGHT POSITION. The selected vehicle operations include: KEY fob UNLOCK, APPROACH VEHICLE, OPEN DOOR, IGNITION ON, TRANSMISSION REVERSE or DRIVE, IGNITION OFF, and KEY FOB LOCK.

The selected vehicle operations sequentially track the major steps that an operator will take when approaching the vehicle and prepare for driving the vehicle. Since most contemporary vehicles have a key fob that controls the automatic locking and unlocking of the vehicle doors, as a vehicle operator approaches the vehicle, the operator typically actuates the key fob to unlock the vehicle (KEY fob "UNLOCK"). Upon reaching the vehicle, the operator will then open the door (OPEN DOOR) to enter the vehicle. The APPROACH VEHICLE step will typically comprise all or part of the time between the depression of the key fob to unlock the door and the opening of the door.

After entering the vehicle, the operator typically will start the vehicle engine (IGNITION "ON"), put the vehicle in gear (TRANSMISSION "REVERSE" or "DRIVE"), and drive to the destination, where the vehicle operator shuts off the ignition (IGNITION "OFF"), leaves the vehicle, and locks the door (key fob "LOCK") with the key fob.

During these standard steps in the operation of a vehicle, the moveable portion 12 and mirror 18 can have different physical positions, especially when the mirror is a power fold mirror as preferred by the invention. Since the mirror assembly 10 is a power fold mirror, the moveable portion 12 can either be in the extended ("OUT") position or the folded ("IN") position. The mirror 18 can also be in either its normal position ("NOM") or in a downwardly tilted position ("DOWN"), which is used when operating the vehicle in reverse. The light element 74 can be either ON or OFF. It can also be cycled between ON and OFF to form a strobe effect ("STROBE"). The position of the light element 74 can also vary between the forward ("FOR"), rearward ("REAR"), and neutral positions for each of the vehicle operations.

The vehicle operations are sensed by the vehicle controller which then sets the desired status for the MIRROR HOUSING POSITION, MIRROR TILT POSITION, LIGHT ON/OFF, and LIGHT POSITION as shown in the table of FIG. 11. The logic of the mirror status conditions for the various vehicle operations will be described in the context of operating the vehicle.

As the operator nears the vehicle, the operator the presses the key fob to unlock the vehicle door. In the KEY fob UNLOCK operational condition, the mirror housing remains in the IN position to reduce the likelihood that the vehicle operator will hit the mirror when entering the vehicle. The mirror tilt remains in the NORMAL position. The light element is turned ON and preferably operated in the STROBE mode to aid the operator in finding the vehicle. It is preferred that the light element 74 be in the forward position.

After unlocking the vehicle with the key fob and while the operator is approaching the vehicle, the light element 74 is set to the ON position instead of the STROBE mode. The switching of the light element 74 to the ON position from the STROBE mode preferably occurs after a predetermined time. The status of the other mirror features does not change, except that the light element 74 can be moved into the neutral position if it is desired to provide a puddle mode illumination as the operator approaches the vehicle The transition from the forward to the neutral position can occur immediately or after the passing of a predetermined time.

Upon opening the door to the vehicle, the light element 74 is turned OFF. It is assumed that when the vehicle operator opens the door, the vehicle operator no longer needs the light element 74 turned ON to aid the vehicle operator in finding the vehicle or in viewing the area surrounding the vehicle as the operator nears the door. In the OPEN DOOR operation, the light element can be either in the FORWARD or NEUTRAL position. The light element is moved to the NEUTRAL position to perform a turn signal function.

When the ignition is turned ON, the mirror housing is moved from the IN to the OUT position, so that the operator can use the exterior mirror assembly 10 in its normal manner. The light element 74 is moved from its current position to the REAR position by energizing the motor 90 in anticipation that the operator may operate the vehicle in the reverse position. While it is preferred that the light element 74 be moved to the REAR position in anticipation that the vehicle will be operated in REVERSE, the light element 74 can be left in the FORWARD position until the vehicle is put into gear or moved into the NEUTRAL position.

After the ignition is turned ON, if the operator places the vehicle in reverse, the mirror is tilted from the NORMAL to the DOWN position to provide the operator with a better view of the rear of the vehicle. The light element 74 is moved to the REAR position if it is currently in another position and turned ON to illuminate the rear portion of the vehicle and the surrounding area to aid the operator in the reverse operation of the vehicle.

If the operator places the vehicle in DRIVE or places the vehicle in DRIVE after a reverse operation, the mirror is left in or returned to the NORMAL tilt position and the light element 74 remains OFF and is moved to the NEUTRAL position to perform a turn signal function. The light element 74 in this condition is then operated in conjunction with the vehicle turn signals.

Upon the turning OFF of the ignition, the moveable portion 12 is rotated from the OUT to the IN position, the mirror is tilted to the normal position if in the DOWN position, and the light 74 is turned OFF and moved to the REAR position. Assuming the key fob is used to lock the vehicle after the ignition is turned OFF, the status of the mirror elements does not change.

It should be noted that the status of the mirror elements as described is in sequence for the major steps in the operation of the vehicle. However, actual use of the exterior mirror assembly 10 is not limited to the sequential operation, and the status of the mirror elements for each of the operations listed in FIG. 11 will be set when the particular operation is initiated regardless of the prior operation.

While the invention has been specifically described in connection with certain specific embodiments thereof, it is to be understood that this is by way of illustration and not of limitation. For example, the illuminating assembly of the invention and the described functions can be used in a mirror not having a power fold function or an adjustable mirror function. The illuminating assembly 70 can also be located in the moveable portion 12 and not just in the support base 36 as illustrated. The utility and functionality of the illuminating assembly according to the invention is not limited to a particular external mirror. The illuminating assembly of the invention can be incorporated into both a folding or fixed mirror and still provide full functionality.

Figure 12:
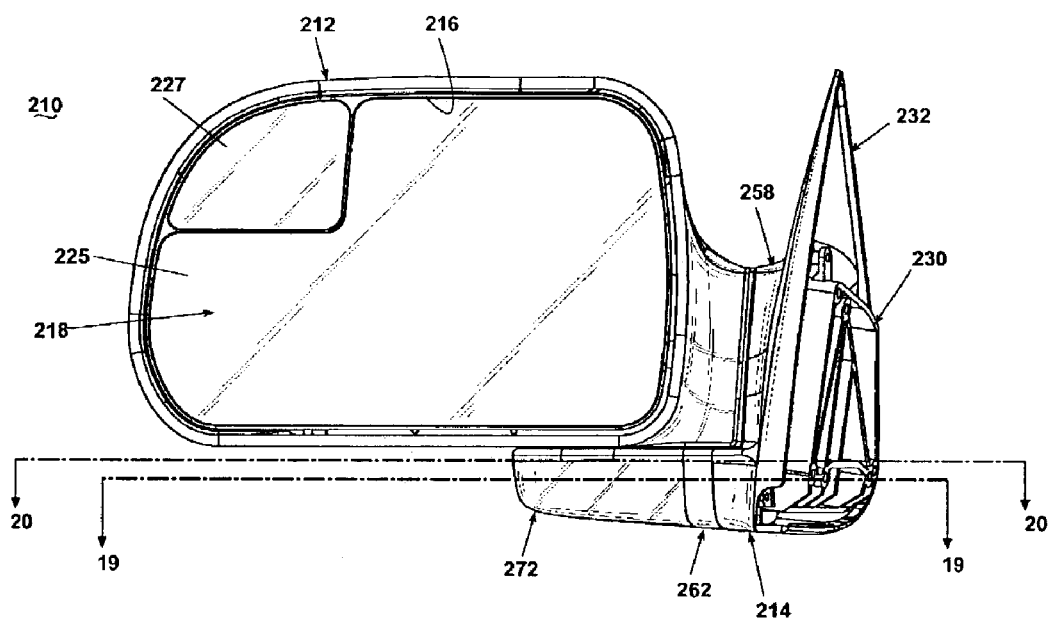
FIG. 12 is a rear perspective view of a second embodiment of the exterior mirror assembly in a drive or extended position and comprising a mirror housing rotatably mounted to a mounting bracket, which is adapted to be connected to a motor vehicle, and a lens mounted to a lower surface of the mirror support and covering an illumination source.
Figure 13:
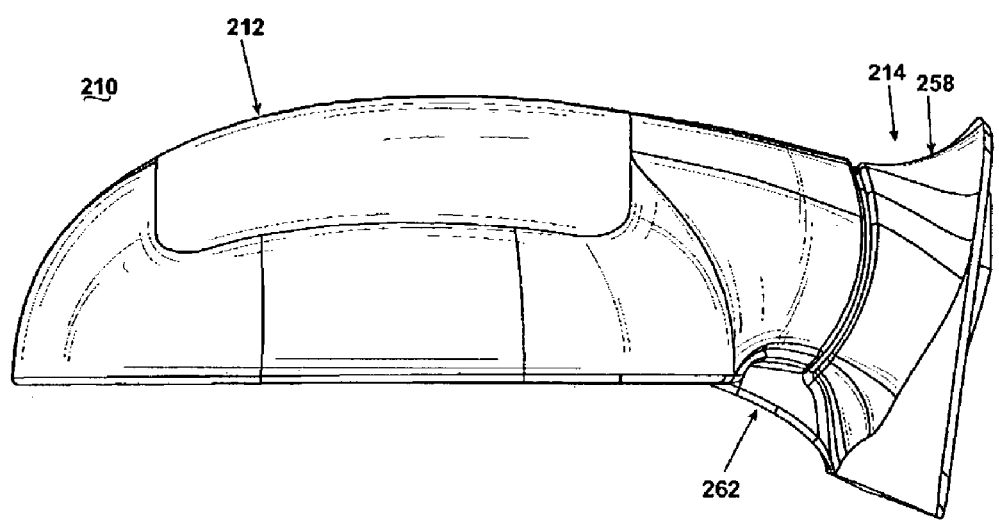
FIG. 13 is a top perspective view of the exterior mirror assembly of FIG. 12.
Figure 14:
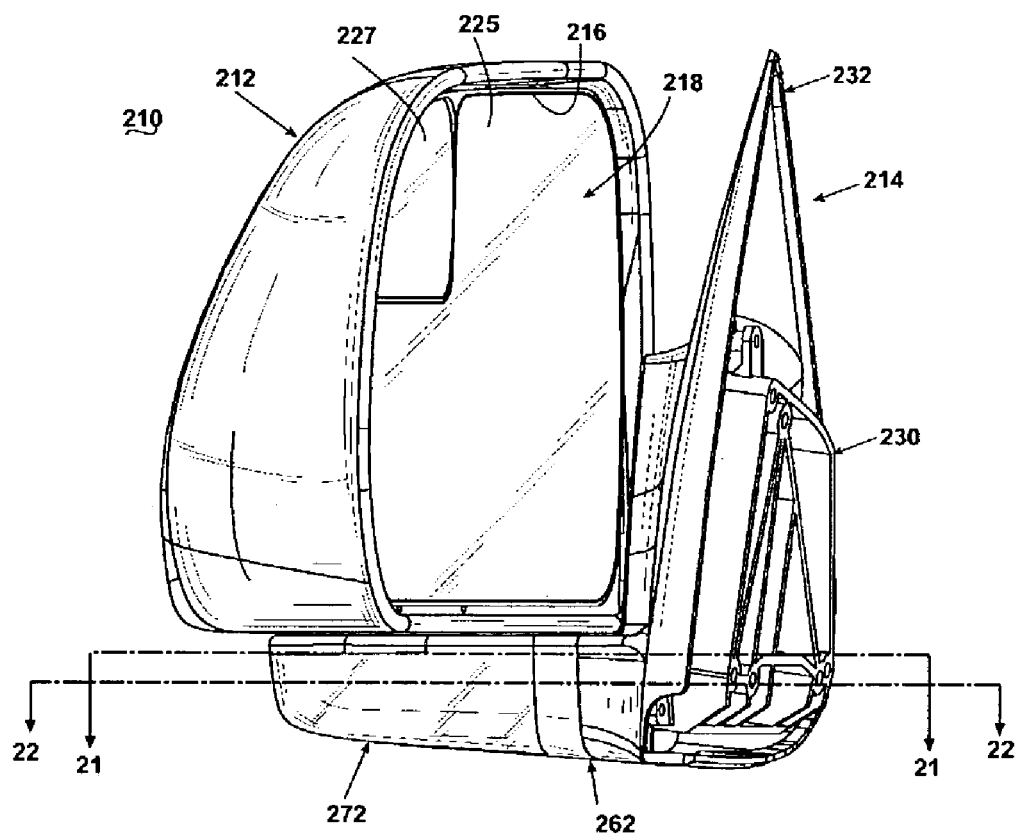
FIG. 14 is a rear perspective view of the exterior mirror assembly of FIG. 12 in a folded position.
Figure 15:
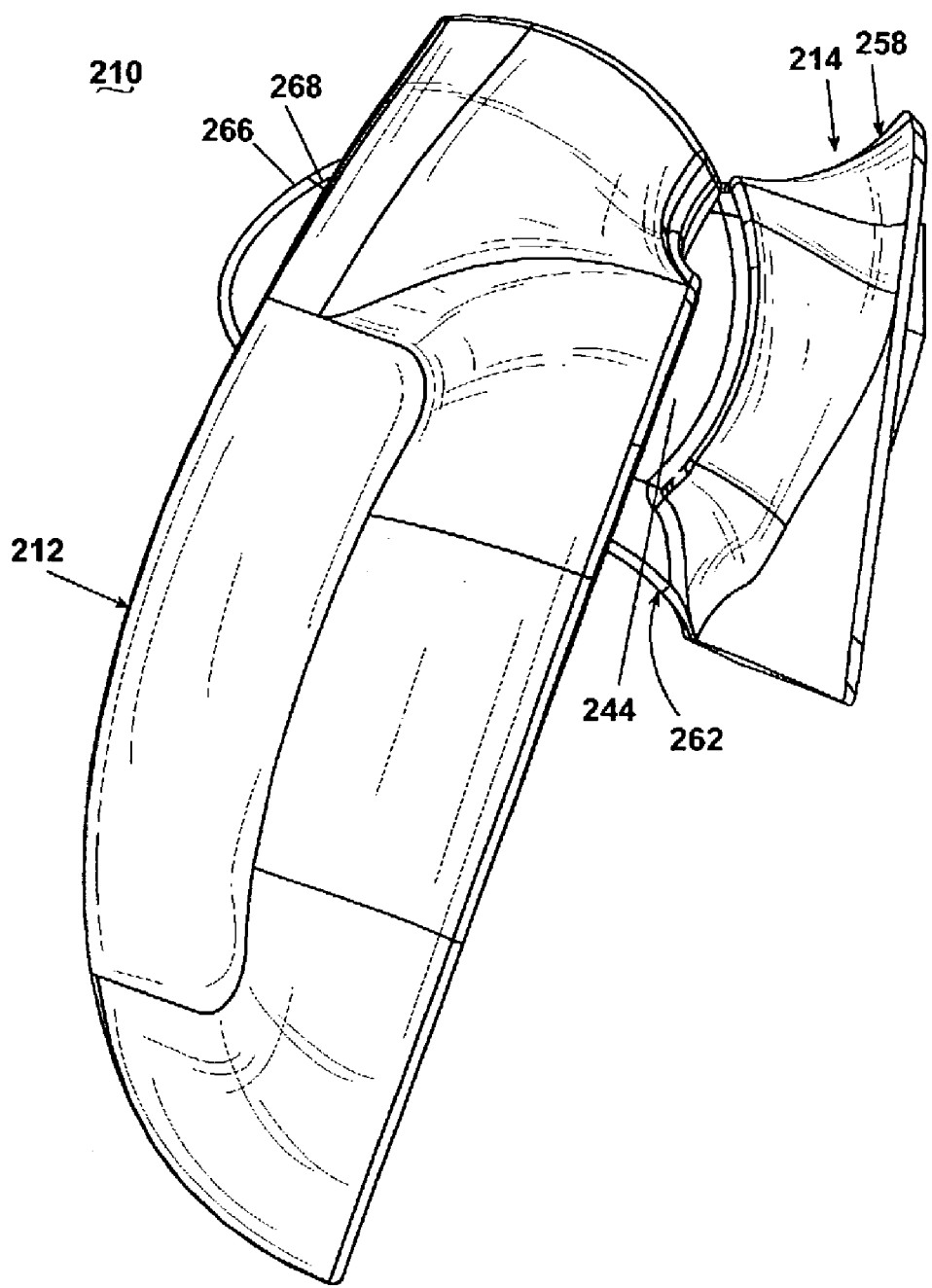
FIG. 15 is a top perspective view of the exterior mirror assembly of FIG. 14.

FIGS. 12–15 illustrate a second embodiment of an external mirror assembly 210 of the type suitable for mounting to the exterior of the motor vehicle 11. FIGS. 12 and 13 illustrate the external mirror assembly 210 in an extended position for use when the vehicle 11 is being driven, whereas FIGS. 14 and 15 illustrate the exterior mirror assembly 210 in a folded position for use when the vehicle 11 is parked.

The external mirror assembly 210 comprises a moveable portion 212 pivotally mounted to a fixed support portion 214, which is adapted to be mounted to the vehicle 11. The moveable portion 212 is closed on a forward side and defines a recess 216 on its rear side in which is received a mirror 218.

Figure 16:
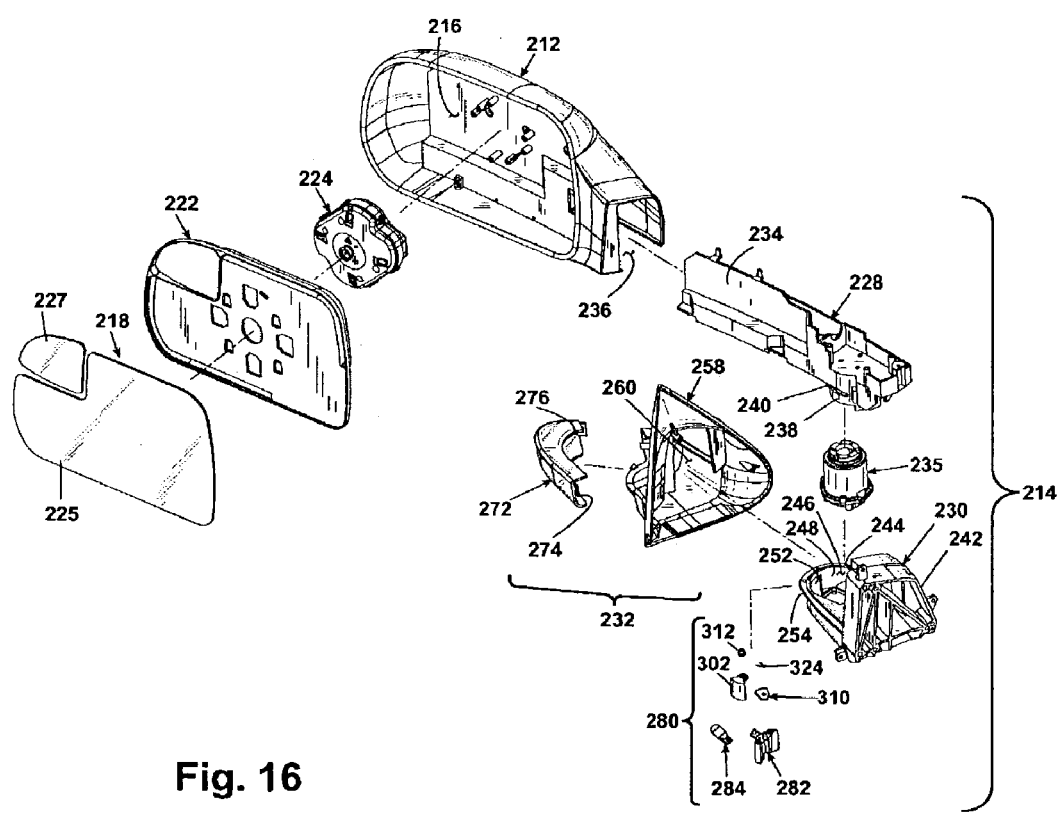
FIG. 16 is an exploded view of the mirror assembly of FIG. 12 illustrating the major components including a support bracket connecting the mirror housing to a pivot mechanism, which is mounted to the mounting bracket, and an illumination source located in the mounting bracket.

Referring also to FIG. 16, the mirror recess 216 of the moveable portion 212 is preferably sized to receive a mirror positioning mechanism comprising a frame 222 (also referred to in the art as a glass housing, case, or carrier) mounted to a drive unit 224, which is sometimes referred to as a "power pack." The drive unit 224 mounts to the interior of the moveable portion 212 in a well-known manner to provide for adjusting the tilt of the frame 222 about at least two axes, and is operably connected to the vehicle's controller (not shown).

The mirror 218 is mounted within the frame 222 thereby permitting the adjustment of the mirror 218 through the adjustment of the frame 222 by the drive unit 224. As illustrated, the mirror 218 is a dual-view mirror comprising a standard planar mirror element 225 and a wide field of view convex mirror element 227. Alternatively, the mirror 218 can comprise a standard planar mirror element without a convex mirror element. The mirror 218, the frame 222, and the drive unit 224 are all well-known and will not be described in greater detail.

As shown in FIG. 16, the fixed support portion 214 comprises a support bracket 228 and a mounting bracket 230, which has a complementary trim cover 232. The support bracket 228 connects the moveable portion 212 to the mounting bracket 230 through a powered fold or pivot mechanism 234, which rotates the support bracket 228 relative to the mounting bracket 230.

The support bracket 228 comprises an arm 234 that is cooperatively received within a channel 236 in the moveable portion 212. A collar 238 is located at one end of the arm 234 and is sized to slidably receive a motorized pivot mechanism 235. A cam 240 extends below a lower edge of the collar 238.

Although not necessary for the invention, the support bracket 228 is of the type that can be used in exterior mirrors that are laterally extendable relative to the vehicle. The complete details of such a support bracket are shown in U.S. Pat. No. 6,213,609 B1, which is incorporated herein by reference.

Figure 17:
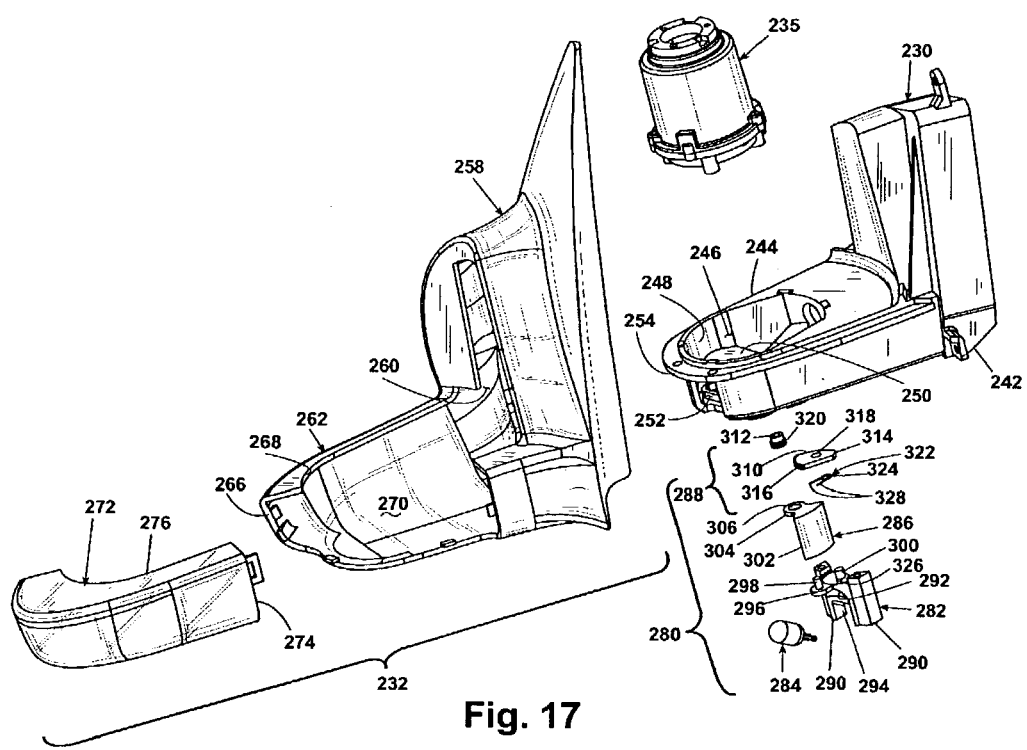
FIG. 17 is an enlarged exploded view of the mounting bracket and the illumination source in combination with the pivot mechanism of FIG. 16, and illustrating the components of the illumination source including a yoke carrying a light element, with a reflector pivotally mounted to the yoke, and a drive mechanism for pivoting the reflector.

Referring to FIGS. 16 and 17, the mounting bracket 230 includes a mounting portion 242 for securing the mounting bracket 230 to the vehicle 11 and a support base 244 extending laterally away from the mounting portion 242. The support base 244 includes a well 246 adapted to receive the pivot mechanism 235. The well 246 is defined by an annular side wall 248 that extends upwardly from a bottom wall 250 on which the pivot mechanism 235 is supported when received within the well 246. A illuminating assembly opening 252 is formed in the side wall 248 near the distal portion of the support base 244. A partial-peripheral lip 254 circumscribes a portion of the support base 244.

The trim cover 232 comprises a shoulder portion 258 and defines a through opening 260 in which the support base 244 is received when the trim cover 232 is mounted to the mounting bracket 230. An open-top sleeve 262 extends away from the shoulder 258 and has a peripheral side wall 266, which terminates in an inwardly directed lip 268. An open portion 270 is formed in the side wall 266 and the lip 268.

The trim cover 232 further comprises a lens 272 that snap-fits to the sleeve 262 and closes the open portion 270. The lens has a side wall 274 and an inwardly-extending lip 276, which corresponds to the side wall 266 and the lip 268 of the sleeve 262. The lens 272 is preferably transparent or translucent.

The sleeve 262 is sized to slidably receive the support base 244 when the trim cover 232 is mounted to the mounting bracket 230. When the lens 272 is mounted to the sleeve 262, the lens 272 overlies the illuminating, assembly opening 252.

The pivot mechanism 235 has a generally cylindrical shape with a hollow interior in which is received an electric motor (not shown) for rotating the support bracket 228 to thereby rotate the moveable portion 212 from an extended position (FIGS. 12 and 13), wherein the moveable portion 212 is substantially perpendicular to the vehicle, to a retracted position (FIGS. 14 and 15), wherein the moveable portion 212 is substantially parallel to the vehicle. The pivot mechanism 235 is well-known and disclosed in U.S. Pat. No. 5,684,646 which is incorporated herein by reference. Therefore, the pivot mechanism 235 will not be described in further detail. It will be understood that the powered pivot mechanism 235 is shown herein as an example of the preferred embodiment only, and that anything which effects the pivotal movement of the mirror of assembly 210 (even if powered by a vehicle occupant's hand) is acceptable as a substitute for the pivot mechanism 235 described herein without departing from the scope of this invention.

An illuminating assembly 280 is mounted to the support base 244. The illuminating assembly 280 comprises a yoke 282 fixedly mounted to the lip 254 of the support base 244 in alignment with the illuminating assembly opening 252. The illuminating assembly further comprises a light element 284 fixedly mounted to the yoke 282 and a reflector assembly 286 movably mounted to the yoke 282 for reflecting the light from the light element 284 in multiple directions depending on the position of the reflector assembly 286. A drive mechanism 288 cooperates with the support bracket 228 to move the reflector 286 between a forward-facing position or forward position, for illuminating a front portion of the vehicle 11, and a rearward-facing position or rearward position, for illuminating a rear portion of the vehicle 11.

Looking at the illuminating assembly 280 in greater detail, the yoke 282 comprises parallel, spaced-a part side rails 290 connected at their upper ends by a cross member 292, and defining a light receptacle 294. A finger 296 extends away from the cross member 292 and above the light receptacle 294 and has a first post 298 extending upwardly orthogonal thereto. A second post 300 is provided in a well on the cross member 292.

The side rails 290 are mounted to the lip 254 of the support base 244 to secure the yoke 282 to the mounting bracket 230. The light element 284 is received within the light receptacle 294 to fixedly mount the light element 284 to the yoke 282. It is preferred that the portion of the rails 290 and the cross member 292 surrounding the receptacle 294 have a reflective surface to reflect the light from the light element 284.

The reflector assembly 286 comprises a reflector 302 having a reflective inner surface 303 (FIG. 18) and a finger 304 extending laterally from the reflector 302. An opening 306 is formed in the finger 304 and is sized to receive the post 298 to mount the reflector 302 to the yoke 282. The reflector 302 is preferably concave with a reflective inner surface.

The drive mechanism 288 comprises a cam follower 310 and a spur gear 312. The cam follower 310 includes a contact surface 314 on a first end and a gear portion 316 on a second end, with an opening 318 therebetween. The opening 318 is sized to receive the post 300 to pivotally mount the cam follower 310 to the yoke 282. The spur gear 312 includes an opening 320 sized to receive the post 298 to rotatably mount the spur gear 312 to the yoke 282. The spur gear 312 is preferably mounted to the post 298 prior to the reflector assembly 286. By doing so, the finger 304 of the reflector assembly 286 helps retain the spur gear 312 on the post 298.

The drive mechanism 288 further comprises a return spring 322 having a central coil 324 and opposing parallel legs 328. The coil is received around a pin 326 in the well of the cross member 292. One of the legs 328 bears against the corresponding rail 290 and the other leg 328 bears against the side of the cam follower 310 to bias the contact surface 314 toward the rail 290 against which the one leg 328 contacts, which corresponds to the reflector 302 being in the rearward position.

Figure 18:
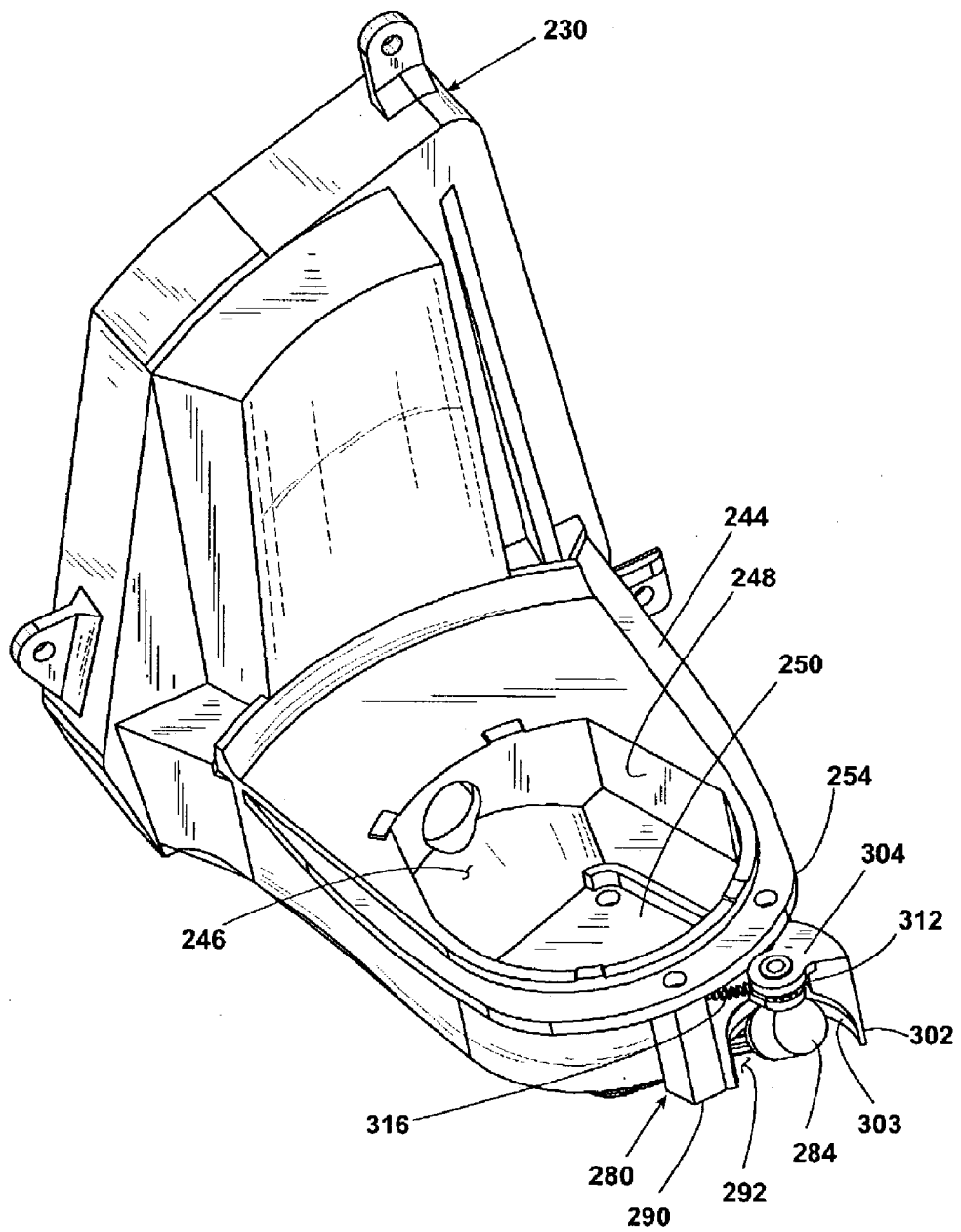
FIG. 18 is a perspective view of the assembled mirror support and illumination source of FIG. 17.

Referring to FIG. 18, the illuminating assembly 280 is shown assembled and mounted to the support base 244, without the trim cover 232 assembled to the mounting bracket 230 for purposes of clarity. As illustrated in FIG. 18, the reflector 302 is shown in the forward position that corresponds to the moveable portion 212 being in the folded position.

When the illuminating assembly 280 is assembled and mounted to the support base 244, the gear portion 316 of the cam follower 310 meshes with the spur gear 312. The contact surface 314 of the cam follower 310 extends through the illuminating assembly opening 252 and into the well 246. When the support bracket 228 and the pivot mechanism 235 are mounted to the support base 244, the collar 238 is received about the pivot mechanism 235 such that the cam 240 extends into the well 246 and will lie in the path of the cam follower 310. Thus, the reflector 302 can be pivoted between the forward position and the rearward position.

When the reflector 302 is the forward or rearward position, the shape of the reflector inner surface is such that it cooperates with the shape of the yoke surrounding the receptacle 294 to collectively form a dish-like reflective surface to improve the amount of light that is reflected from the light element 284.

Figure 19:
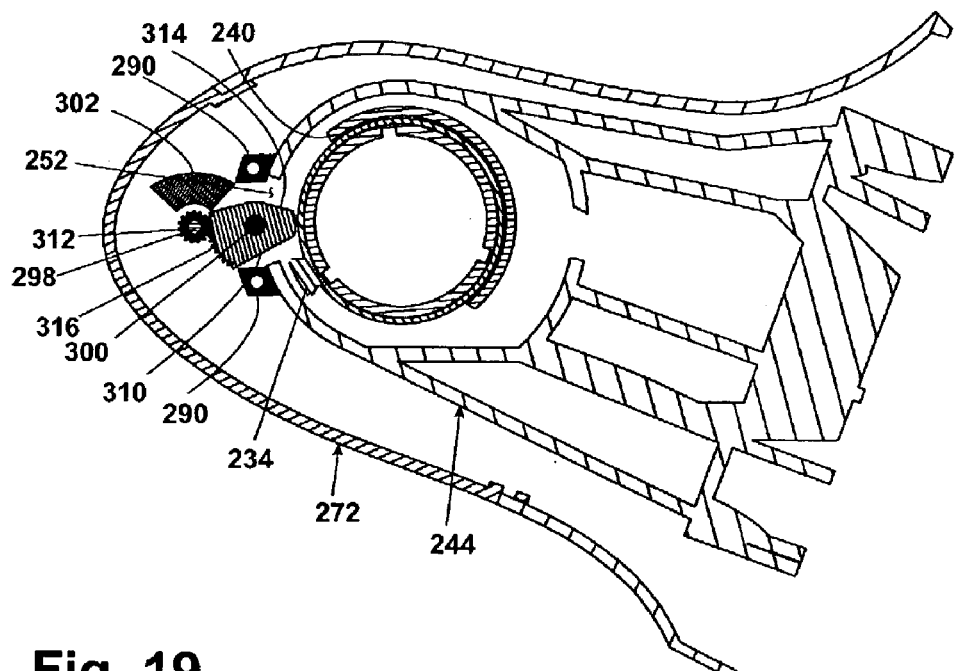
FIG. 19 is a schematic sectional view taken along line 19—19 of FIG. 12 illustrating the position of the reflector relative to a transfer gear and a cam of the drive mechanism when the mirror assembly is in the extended position.
Figure 20:
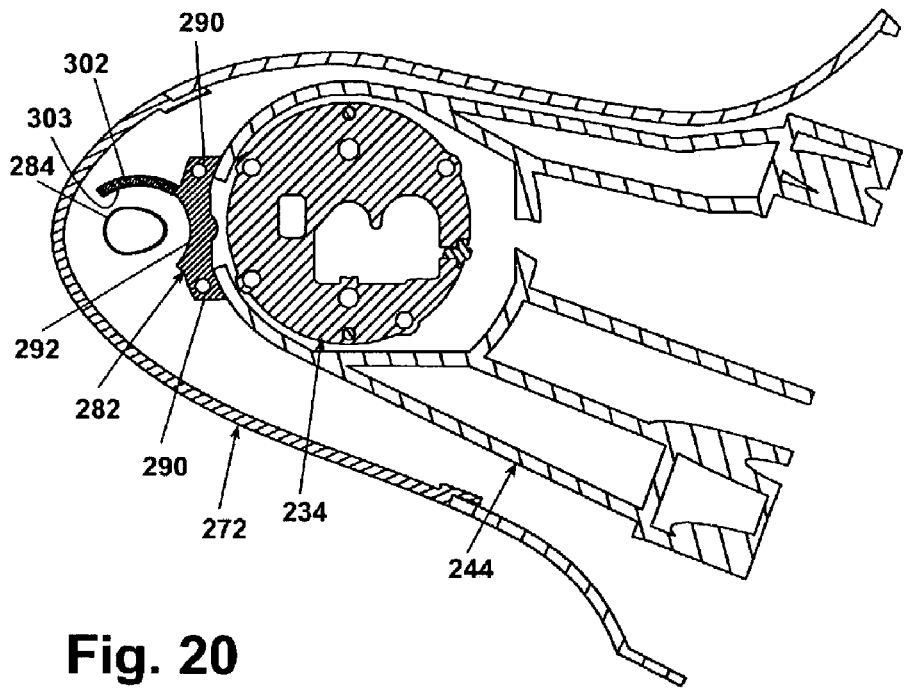
FIG. 20 is a schematic sectional view taken along line 20—20 of FIG. 12 illustrating the position of the reflector relative to the light element when the mirror assembly is in the extended position.

The operation of the mirror assembly 210 will now be described with respect to FIGS. 19–22 specifically and FIGS. 12–15 generally. For purposes of this description, it is assumed that the moveable portion 212 begins in the extended position, which is illustrated in FIGS. 19 and 20. In the extended position, the reflector 302 is rearwardly oriented to reflect any light from the light element 284 toward the rear of the vehicle through the lens 272. The cam follower 310 is positioned such that the contact surface 314 extends through the illuminating assembly opening 252 in the support base 244 and is not in contact with the cam 240 of the collar 238 extending from the support bracket 228. The return spring 322 biases the cam follower 310 into this position.

Figure 21:
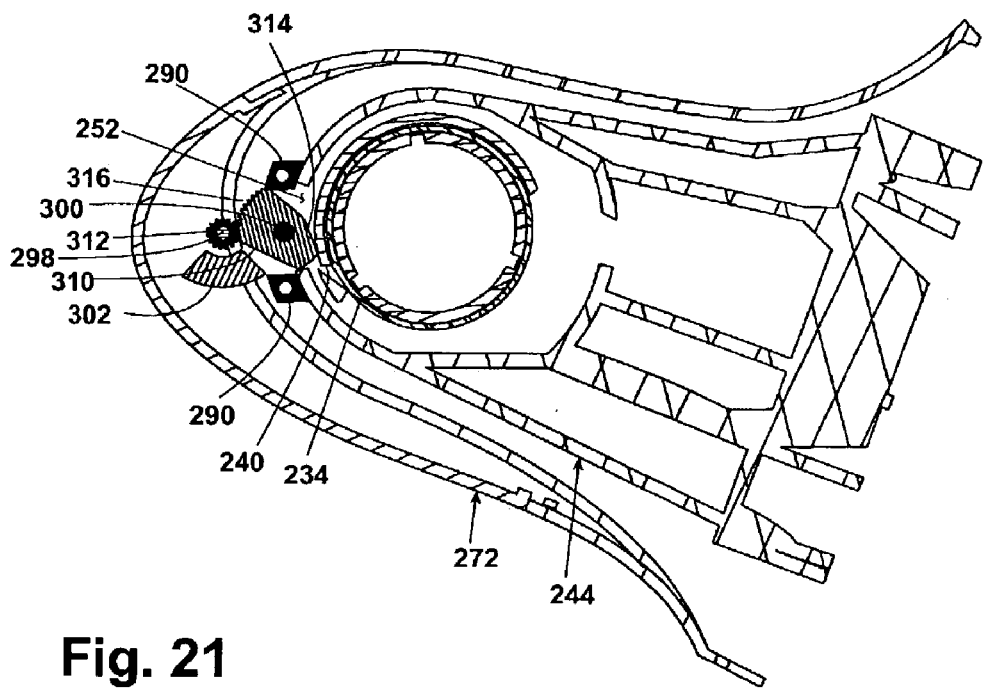
FIG. 21 is a schematic sectional view taken along line 21—21 of FIG. 14 and illustrates the position of the reflector relative to the transfer gear and the cam of the drive mechanism when the mirror assembly is in the folded position.
Figure 22:
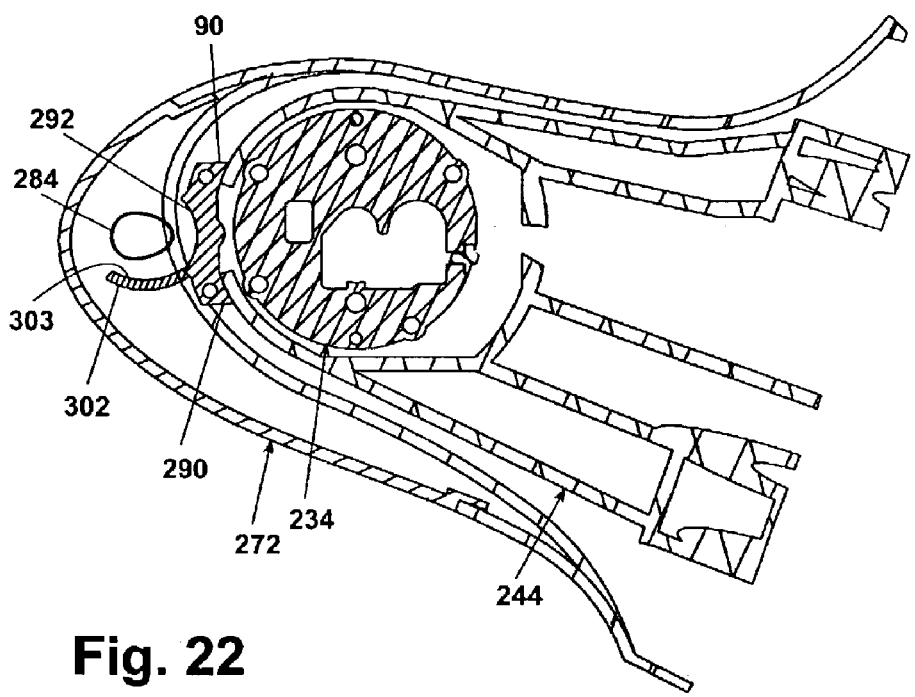
FIG. 22 is a schematic sectional view taken along line 22—22 of FIG. 14 and illustrates the position of the reflector relative to the light element when the mirror assembly is in the folded position.

Referring to FIGS. 21 and 22, when the moveable portion 212 is moved from the extended to the folded position by the actuation of the pivot mechanism 235, the pivot mechanism 235 rotates the cam 240 into contact with the contact surface 314 to rotate the cam follower 310 clockwise, as seen in FIG. 21, about the post 300 and against the force of the return spring 322. The rotation of the cam follower 300 and the cam 240 cause a corresponding rotation of the spur gear 312, which causes a simultaneous rotation of the reflector 302. The rotational movement of the cam follower 310 is great enough to rotate the reflector 302 approximately 180 degrees such that it is pointing in the forward position whereby the light emitted from the light element 284 will be reflected forwardly through the lens 272.

The cam 240 remains in contact with a portion of the contact surface 314 when the moveable portion 212 is in the folded position as illustrated in FIGS. 21 and 22. The contact between the cam 240 and the contact surface 314 of the cam follower 310 maintains the reflector 302 in the forward position as long as the moveable portion 212 remains in the folded position.

As best seen and FIGS. 20 and 22, when the reflector 302 is in either the forward or rearward position, the inner surface 303 of the reflector 302 forms a dish-shaped reflective surface with the yoke 282 to enhance the amount of light reflected from the light element 284.

It is anticipated that the operation of the mirror assembly 210 will be controlled by the vehicle control system, which responds to signals received by a key fob in a well-known manner. It is preferred that when the vehicle is in a parked condition (typically when the vehicle is turned off and/or the transmission is in park), the vehicle control system will rotate the moveable portion 212 from the extended position to the folded position. As a vehicle operator approaches the vehicle, the operator will unlock the vehicle using the key fob. When the vehicle controller receives the unlock signal from the key fob, the vehicle controller will energize the light element 284. Since the moveable portion 212 is in the folded position, the reflector 302 will be in the forward position and the light illuminated by the energized light element 284 will be directed forwardly from the vehicle to aid the operator in locating the vehicle.

When the vehicle is in a drive condition (typically when the vehicle is turned on and/or the transmission is in reverse), the vehicle controller energizes the pivot mechanism 235 to move the moveable portion 212 from the folded position to the extended position. In the extended position, the reflector 302 is in a rearward position to reflect the light from the light element 284 rearwardly through the lens 272 to illuminate the rear of the vehicle. The controller preferably shuts off power to the light element 284 when the vehicle is no longer in reverse.

Figure 23:
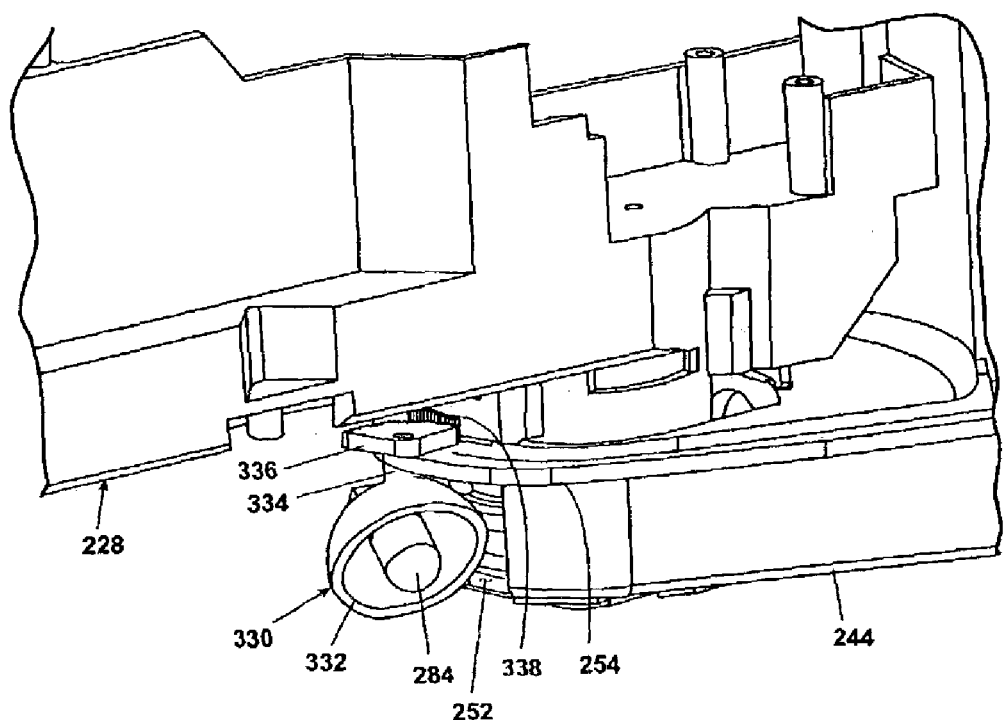
FIG. 23 is a perspective view of a third embodiment of the exterior mirror assembly and movable illumination source which is illustrated in a rearward-directed position corresponding to the mirror assembly being in the extended position.
Figure 24:
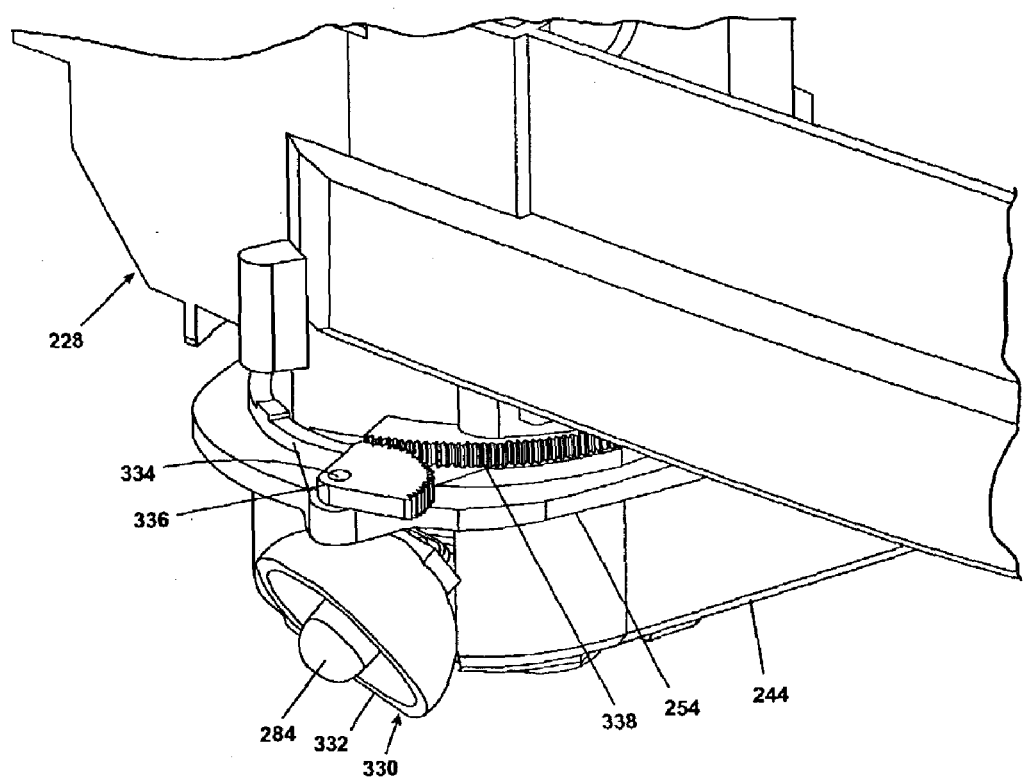
FIG. 24 is a perspective view of the third embodiment movable light of FIG. 23, with the third embodiment light in a forward-directed position corresponding to the mirror assembly being in the folded position.

FIGS. 23 and 24 illustrate a third embodiment of the mirror assembly according to the invention. The third embodiment of the mirror assembly differs from the second embodiment in the structure for the illuminating assembly. Therefore, similar numerals will be used to identify similar parts between the second and third embodiments and the description of the third embodiment will be limited to the new illuminating assembly and the related structure.

The illuminating assembly 330 for the third embodiment comprises a dish reflector 332, which mounts the light element 284. A post 334 extends upwardly from a rear portion of the dish reflector 332 and through an opening in the lip 254 of the support base 244. A spur gear 336 is mounted to the upper end of the post 334 to thereby secure the dish reflector 332 to the lip 254.

The collar 238 of the support bracket 228 comprises an external gear 338 instead of the cam 240 found in the first embodiment. The external gear 338 meshes with the spur gear 336. When the moveable portion 212 is rotated between the extended and folded positions by the pivot mechanism 234, the external gear 338 rotates the spur gear 336 to rotate the dish reflector 332 from the rearward position as seen in FIG. 23 to the forward position as seen in FIG. 24.

Figure 25:
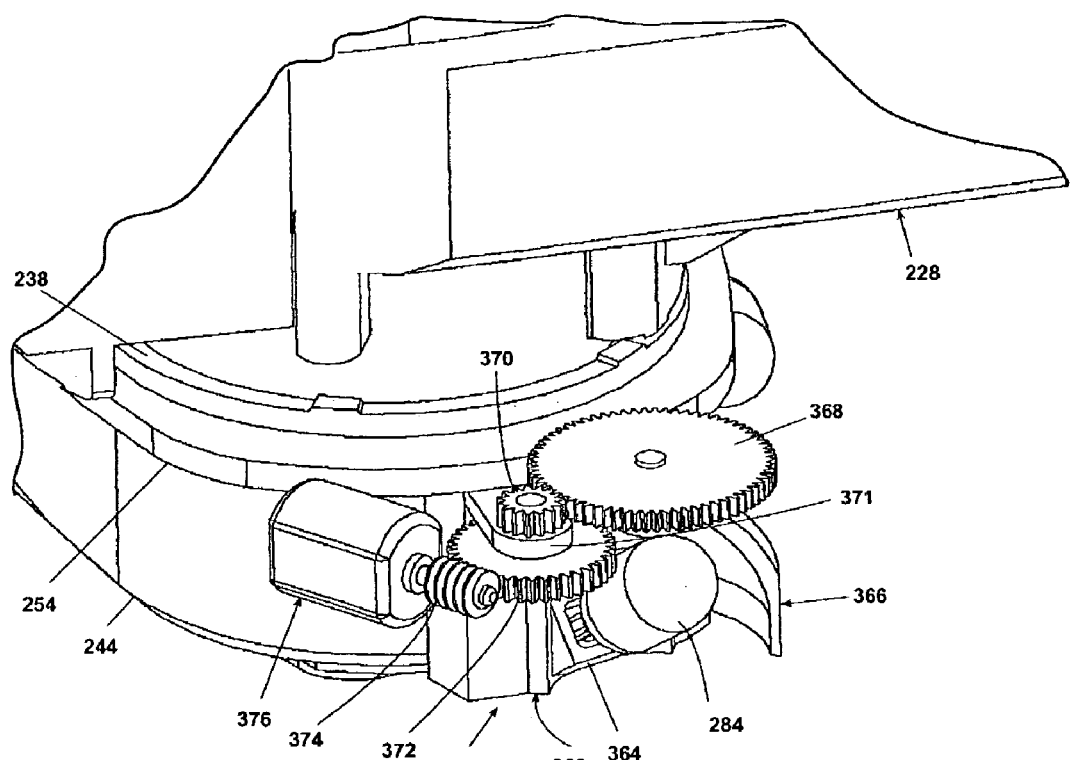
FIG. 25 is a perspective view of a fourth embodiment of the exterior mirror assembly and movable illumination source which is illustrated in a rearward-directed position corresponding to the mirror assembly being in the extended position.
Figure 26:
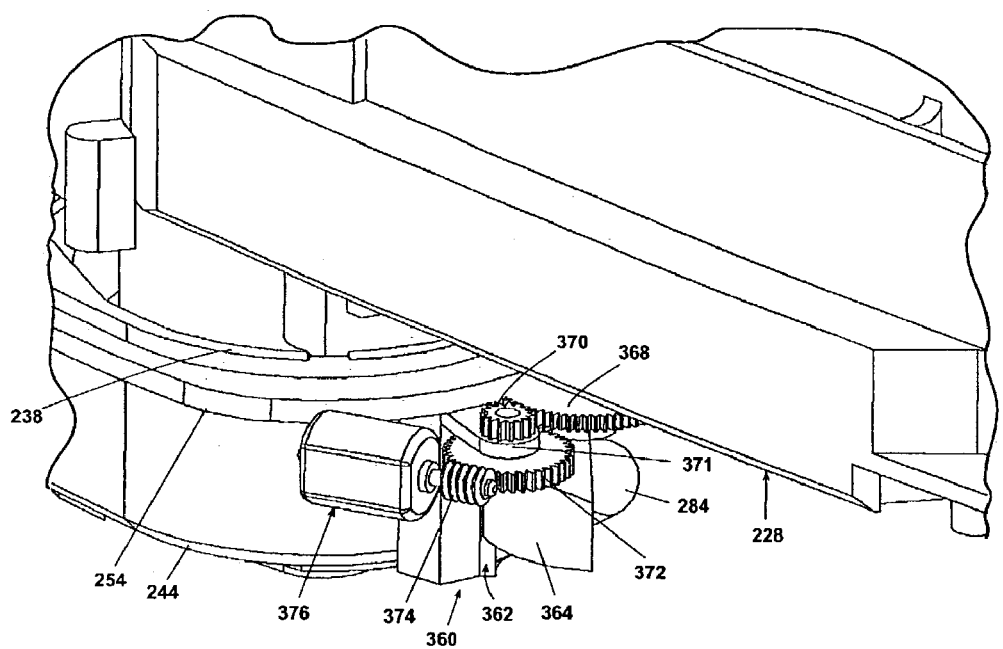
FIG. 26 is a perspective view of the fourth embodiment movable light of FIG. 25, with the fourth embodiment light in a forward-directed position corresponding to the mirror assembly being in the folded position.

FIGS. 25 and 26 illustrate a fourth embodiment of the external mirror assembly according to the invention. The fourth embodiment mirror assembly differs from the second embodiment also in the structure of the illuminating assembly. Therefore, similar numerals will be used to identify similar parts between the fourth and the second embodiments and the description of the fourth embodiment will be limited to the new illuminating assembly and related structure.

One difference between the illuminating assembly 360 for the fourth embodiment and the illuminating assembly 280 for the second embodiment is that the illuminating assembly 360 is actuated independently of the rotation of the support bracket 228. The illuminating assembly 360 comprises a yoke 362 having a receptacle 364 in which is mounted the light element 284. A reflector 366 is pivotally mounted to an upper portion of the yoke 362 and includes a drive gear 368, whose rotation rotates the reflector 366.

A spur gear 370 is rotatably mounted to a finger 371 extending from the support base 244. The spur gear 370 meshes with the drive gear 368 such that the rotation of the spur gear 370 rotates the drive gear 368. The spur gear 370 is mounted on a common shaft with a transfer gear 372, which meshes with an output gear 374 associated with an electric motor 376. The transfer gear 372 is substantially larger in diameter than the spur gear 370, thereby providing in a gear reduction. The electric motor 376 is mounted to the support base 244 behind the trim cover 232 through a suitable mounting.

To move the reflector 366 from the forward position as shown in FIG. 25 to the rearward position as shown in FIG. 26, the vehicle control system energizes the electric motor 376. To return the reflector back to the forward position, the vehicle controller merely reverses the electric motor 376. Thus, the forward and reverse operation of the electric motor 376 will effect the movement of the reflector 366 between the forward and rearward positions.

Figure 27:
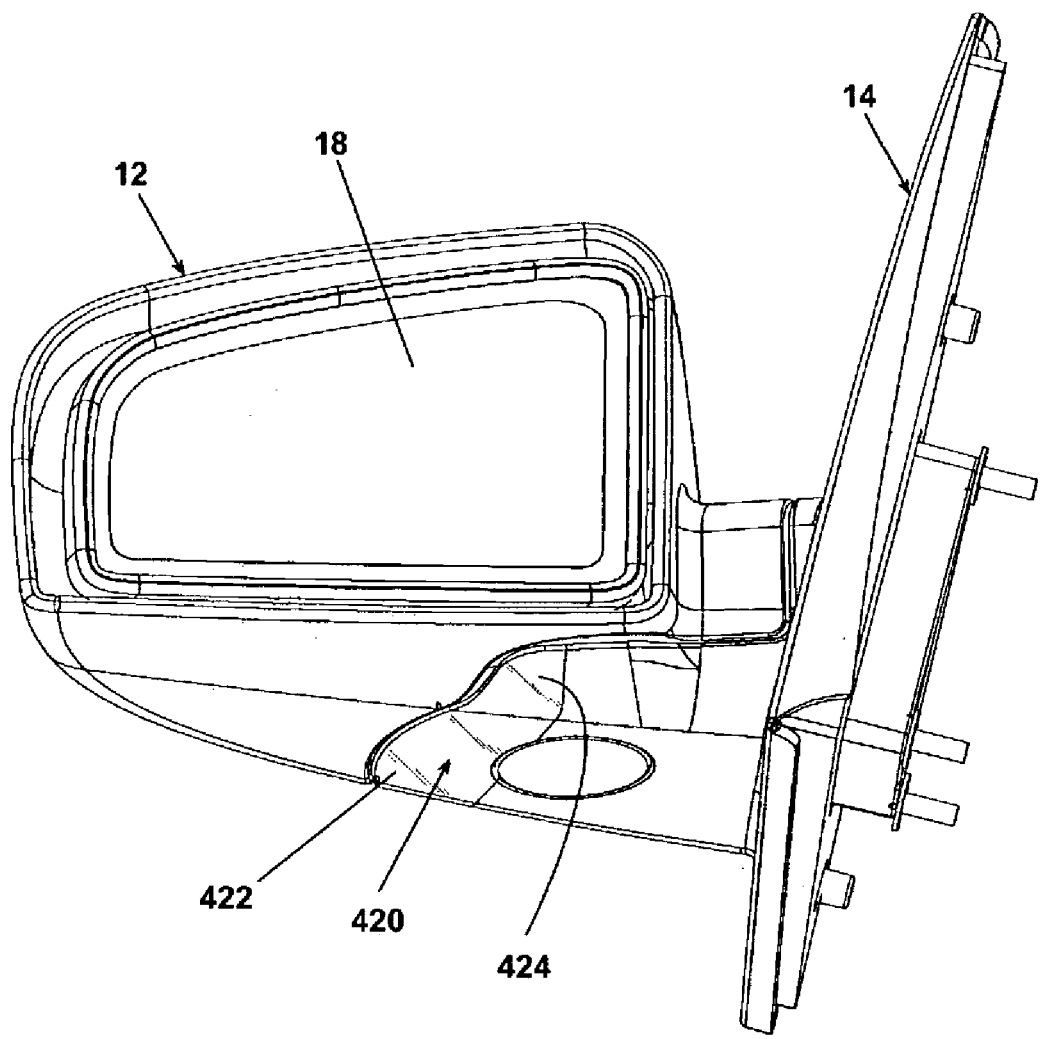
FIG. 27 is a perspective view of a fifth embodiment of a vehicle exterior mirror assembly from beneath the mirror assembly comprising a light-emitting diode assembly illuminated to form a puddle light according to the invention and a lens covering the light-emitting diode assembly.
Figure 28:
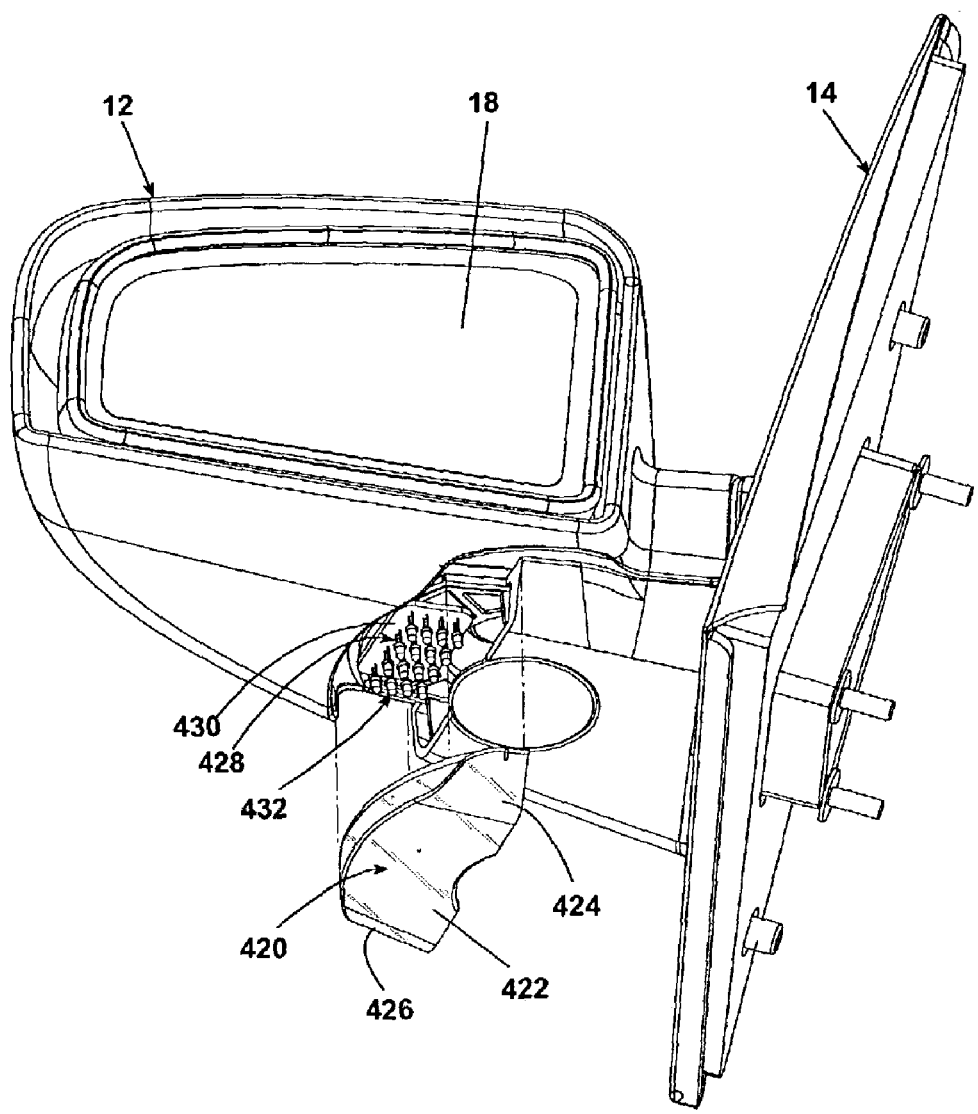
FIG. 28 is a partially exploded view of the external mirror assembly of FIG. 27 showing the arrangement of the lens and the light-emitting diode assembly.

FIG. 27 shows a fifth embodiment of the external mirror assembly 10 in which a portion of the underside of the external moveable portion 12 comprises a generally clear, transparent lens 420, enabling light generated from within the housing 12 to travel through the lens 420 to the exterior of the housing 12. Referring also to FIG. 28, in the preferred embodiment, the lens 420 is a somewhat U-shaped piece, preferably formed of a durable material such as a high impact strength plastic, comprising a bottom facet 422, a rearward facet 424, and a forward facet 426. The lens 420 is adapted to integrate into the underside of the external moveable portion 12, and it will be readily apparent to a person of ordinary skill in the art that the lens 420 can be fabricated in any appropriate shape in order to integrate the lens 420 into the overall design of the external moveable portion 12, consistent with the function of the lens as hereinafter described. Although the lens 420 (and an associated LED assembly) are shown on the underside of the housing 12, it can also be located on the base, i.e., the fixed support portion 14, without departing from the scope of this invention.

A light-emitting diode (LED) assembly 428 comprises a generally plate-like panel 430 to which is mounted an LED array 432 comprising first color LEDs 434 emitting light of a first color, and second color LEDs 436 emitting light of a second color. Preferably, the first color LEDs 434 emit light of an amber color and the second color LEDs 436 emit light of a blue-green color, such that the combined illumination of the first color LEDs 434 and the second color LEDs 436 will result in light having a generally white color. The LED assembly 428 can be mounted to a suitable conventional mounting frame (not shown) in the interior of the moveable portion 12, or in the illumination source recess 48 as an element of the illumination device 70, previously described herein, so that light will be transmitted from the LED assembly 428 through the lens 420 to the exterior of the moveable portion 12. Conventional wiring (not shown) operably connects the LED assembly 428 to suitable controls (not shown) located in the interior of the motor vehicle which are readily accessible to the operator. Preferably, the controls enable the LED assembly 428 to be selectively operated so that either the first color LEDs 434 can be selectively illuminated, or both the first color LEDs 434 and the second color LEDs 436 can be selectively illuminated.

Figure 29:
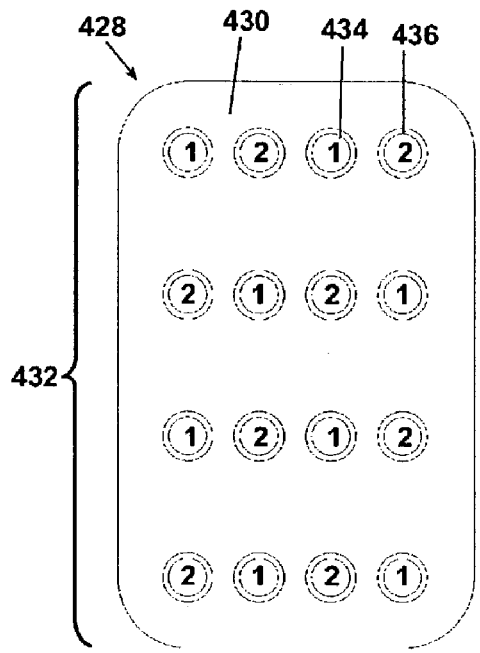
FIG. 29 is a schematic view of the light-emitting diode assembly of FIG. 28 showing a first embodiment of the light-emitting diode assembly.
Figure 30:
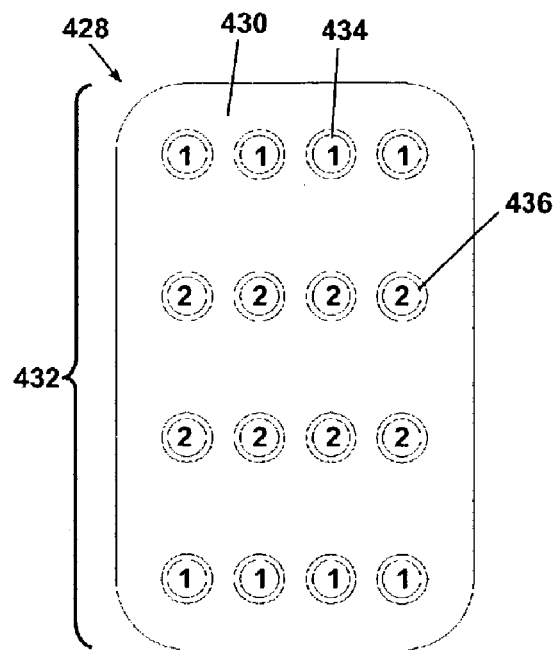
FIG. 30 is a schematic view of the light-emitting diode assembly of FIG. 28 showing a second embodiment of the light-emitting diode assembly.
Figure 31:
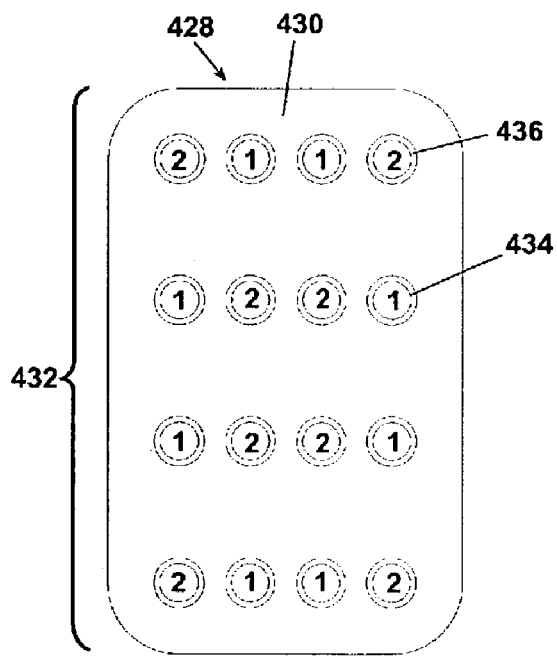
FIG. 31 is a schematic view of the light-emitting diode assembly of FIG. 28 showing a third embodiment of the light-emitting diode assembly.

The LEDs 434, 436 can be selectively arranged in any configuration. Referring now to FIG. 29, in which the first color LEDs are designated with the numeral "1" and the second color LEDs are designated with the numeral "2," the LEDs 434, 436 can be arranged in a "checkerboard" pattern, with alternating colors along each row and column comprising the LED assembly 428. Referring to FIG. 30, the LEDs 434, 436 can be arranged in rows comprising a single color, with the rows arranged in any desired order. Referring to FIG. 31, the LEDs 434, 436 can be arranged to form a pattern. As an example, the first color LEDs 434 in FIG. 31 form a generally circular pattern. It will be readily apparent to one of ordinary skill in the art that the LEDs 434, 436 can be arranged in any desired configuration, provided that the number and placement of the LEDs 434, 436 produce light of the desired quality and intensity.

Figure 32:
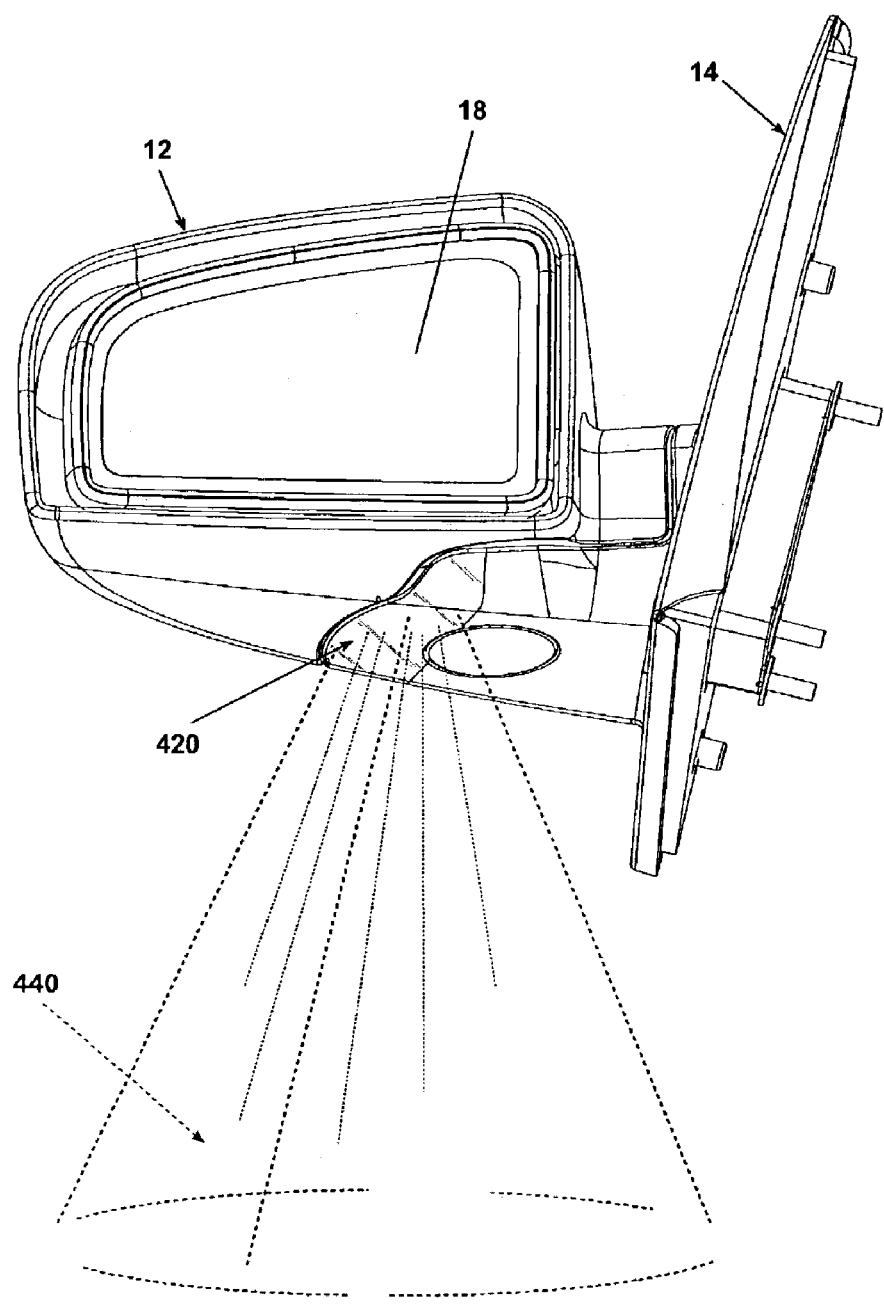
FIG. 32 is a perspective view of the external mirror assembly of FIG. 27 showing the light-emitting diode assembly illuminated to form a puddle light.
Figure 33:
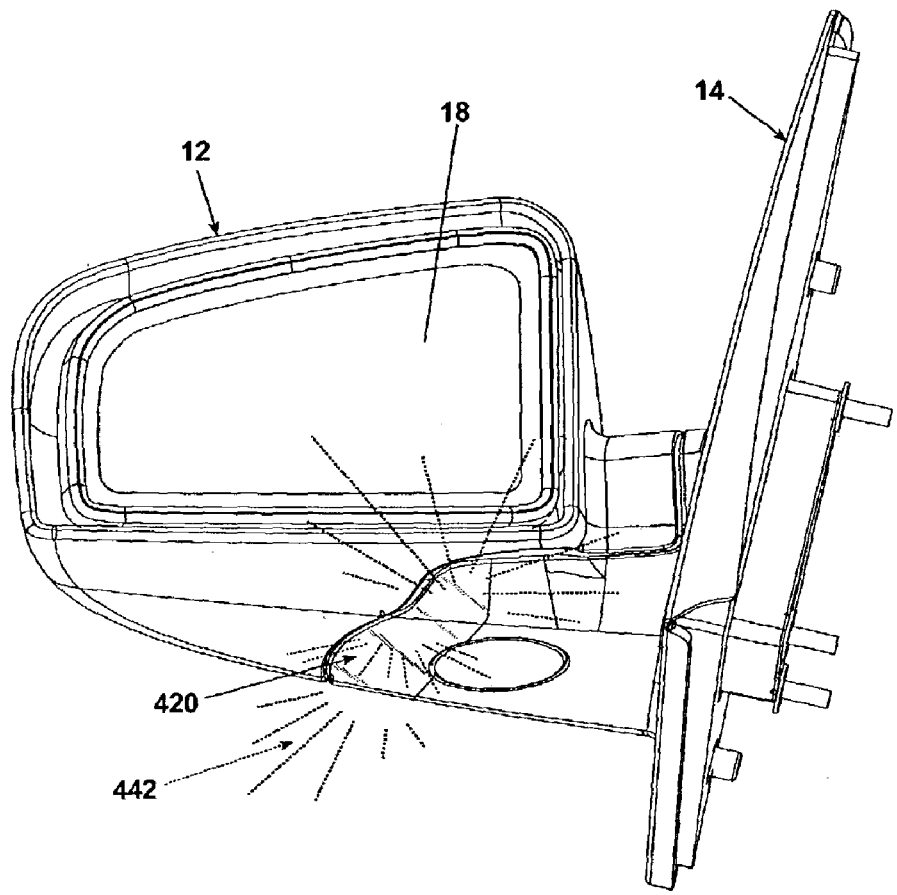
FIG. 33 is a perspective view of the external mirror assembly of FIG. 27 showing the light-emitting diode assembly illuminated to form a turn signal.

Referring now to FIG. 32, the combined illumination of all the LEDs 434, 436 will produce a generally white light which will project downwardly through the bottom facet 422 of the lens 420 to form a "puddle light" beam 440 of white light for illuminating an area below and adjacent to the external mirror assembly 10. It will be evident that the light will also be transmitted through the rearward facet 424 and the forward facet 426, which will expand the area illuminated by the white light both forward and rearward of the mirror assembly 10. Referring to FIG. 33, alternatively, illumination of only the LEDs of a selected color, such as the first color LEDs 434, will produce light of only the first color, which will project through the lens 420 and be observed through the bottom facet 422, the rearward facet 424, and the forward facet 426. Preferably, these LEDs will be operatively connected to the turn signal indicator of the motor vehicle to be operated when the turn signal is operated.

It will be understood that any of the light assemblies described herein can be selectively actuated with other vehicular lighting assemblies, such as turn signals, brake lights, reverse lights, headlights, running lights, fog lights, parking lights and the like without departing from the scope of this invention. In addition various illumination sources can be used without departing from the scope of this invention as well, including incandescent lamps, light-emitting diodes (LEDs), light pipes or other fiber optics from a remote illumination source, etc.

The external mirror assembly incorporating the LEDs provides additional lighting options in a rear view mirror while maintaining a compact configuration. The limitations of incandescent lamps, particularly size and durability, are avoided by the use of LEDs. The limitations of white light LEDs, i.e. cost and fabrication difficulty, are avoided through the use of complementary colored LEDs which, when illuminated in combination, produce a white light. Through appropriate controls, including interconnection with the vehicle's turn signals, the LEDs can be selectively illuminated to provide in one instance a white light for use as a "puddle light" or "rear assist light" and in another instance a colored light providing an externally-visible turn signal indicator in addition to the vehicle's conventionally-positioned turn signals.

While the invention has been specifically described in connection with certain specific embodiments thereof, it is to be understood that this is by way of illustration and not of limitation. Reasonable variation and modification are possible within the scope of the foregoing disclosure and drawings without departing from the scope of the invention.

What is claimed is:

1. A vehicular mirror system comprising:
   a vehicular mirror assembly adapted to be mounted to a vehicle, the vehicular mirror assembly having a reflective element mounted therein; and
   said vehicular mirror assembly comprising an illumination device, said illumination device emitting light when electrically powered;
   said illumination device comprising at least one device selected from the group consisting of a ground illumination device, a signal light device, an approach light device and a reverse light device; and
   a controller, said controller responsive to a wireless signal transmitted from a device carried by a person approaching the vehicle, said controller responsive to said signal by operating said illumination device at least initially in a strobe mode to aid the person in finding the vehicle.

2. The vehicular mirror system of claim 1 wherein said operation of said illumination device in said strobe mode terminates after a predetermined time has elapsed.

3. The vehicular mirror system of claim 2 wherein said illumination device continues to operate in a non-strobe mode after said predetermined time has elapsed.

4. The vehicular mirror system of claim 1 wherein the illumination device comprises a light source which is moveable between at least a first position and a second position.

5. The vehicular mirror system of claim 1 wherein said illumination device comprises a light source having at least one incandescent bulb.

6. The vehicular mirror system of claim 1 wherein said illumination device comprises a light source having at least one light-emitting diode.

7. The vehicular mirror system of claim 1 wherein said illumination device comprises a light source and wherein an electric motor moves said light source between at least a first position and a second position.

8. The vehicular mirror system of claim 1 wherein said illumination device comprises a fixed light source and a reflector that is moveable between at least a first position and a second position.

9. The vehicular mirror system of claim 8 wherein said reflector comprises a convex mirror.

10. The vehicular mirror system of claim 8 wherein said fixed light source comprises at least one incandescent bulb.

11. The vehicular mirror system of claim 8 wherein said fixed light source comprises at least one light-emitting diode.

12. The vehicular mirror system of claim 8 wherein said illumination device comprises an electric motor operably interconnected to the reflector for moving the reflector between at least the first position and the second position.

13. A vehicular mirror system comprising:
    a vehicular mirror assembly:
    said vehicular mirror assembly comprising a base portion adapted to be mounted to a vehicle and a movable portion movably mounted to said base portion for movement between an extended position and a folded position, said movable portion having a reflective element mounted therein;
    said vehicular mirror assembly including an illumination device, said illumination device emitting light when electrically powered;
    a controller, said controller responsive to a wireless signal transmitted from a device carried by a person approaching the vehicle, said controller responsive to said signal by operating said illumination device at least initially in a strobe mode to aid the person in finding the vehicle.

14. The vehicular mirror system of claim 13 wherein said illumination device is mounted for movement between at least a first position to perform a first illumination function and a second position to perform a second illumination function and further comprising an actuator operably interconnected to the illumination device to move the illumination device between the first and second positions.

15. The vehicular mirror system of claim 13 wherein said illumination device comprises a light source which is moveable between at least a first position and a second position.

16. The vehicular mirror system of claim 15 wherein said light source comprises at least one incandescent bulb.

17. The vehicular mirror system of claim 15 wherein said light source comprises at least one light-emitting diode.

18. The vehicular mirror system of claim 15 wherein said illumination device comprises an electric motor operably interconnected to said light source for moving said light source between at least the first position and the second position of said light source.

19. The vehicular mirror system of claim 13 wherein said illumination device comprises a reflector that is moveable between at least a first position and a second position.

20. The vehicular mirror system of claim 19 and further comprising a driver operably coupling at least one of said movable portion of said vehicular mirror assembly and said base portion of said vehicular mirror assembly with a reflector such that the movement of the vehicular mirror assembly between the extended position and the retracted position moves the reflector between at least the first position and the second position of said reflector.

21. The vehicular mirror system of claim 20 wherein said reflector comprises a convex mirror.

22. The vehicular mirror system of claim 20 wherein said illumination device comprises a light source.

23. The vehicular mirror system of claim 22 wherein said light source comprises at least one incandescent bulb.

24. The vehicular mirror system of claim 22 wherein said light source comprises at least one light-emitting diode.

25. A vehicular mirror system of claim 13 wherein said controller terminates said strobe mode after a predetermined period has elapsed.

26. The vehicular mirror system of claim 25 wherein said illumination device emits non-strobing light after said termination of said strobe mode.

27. The vehicular mirror system of claim 13 wherein said strobe mode is operational as the vehicular mirror assembly moves between the folded and the extended positions.

* * * * *